(12) United States Patent
Matono et al.

(10) Patent No.: US 7,518,826 B2
(45) Date of Patent: Apr. 14, 2009

(54) PERPENDICULAR MAGNETIC RECORDING HEAD AND MAGNETIC RECORDING APPARATUS

(75) Inventors: Naoto Matono, Saku (JP); Yuichi Watabe, Tokyo (JP)

(73) Assignees: TDK Corporation, Tokyo (JP); SAE Magnetics (H.K.), Ltd., Shatin, N.T. (HK)

( * ) Notice: Subject to any disclaimer, the term of this patent is extended or adjusted under 35 U.S.C. 154(b) by 485 days.

(21) Appl. No.: 11/264,033

(22) Filed: Nov. 2, 2005

(65) Prior Publication Data

US 2006/0250712 A1 Nov. 9, 2006

(30) Foreign Application Priority Data

Nov. 8, 2004 (JP) ............................. 2004-323252
Oct. 28, 2005 (JP) ............................. 2005-315218

(51) Int. Cl.
*G11B 5/127* (2006.01)
(52) U.S. Cl. ..................................................... 360/126
(58) Field of Classification Search ........................ None
See application file for complete search history.

(56) References Cited

U.S. PATENT DOCUMENTS

| | | | |
|---|---|---|---|
| 5,872,693 A | 2/1999 | Yoda et al. | |
| 6,198,597 B1 | 3/2001 | Tateyama et al. | |
| 6,317,288 B1 * | 11/2001 | Sasaki | 360/125.42 |
| 6,624,970 B1 * | 9/2003 | Sasaki | 360/125.56 |
| 6,680,815 B2 * | 1/2004 | Sasaki | 360/125.56 |
| 6,697,221 B2 * | 2/2004 | Sato et al. | 360/125.13 |
| 6,728,064 B2 * | 4/2004 | Sato et al. | 360/125.63 |
| 6,757,141 B2 * | 6/2004 | Santini et al. | 360/317 |
| 6,850,390 B2 * | 2/2005 | Sato et al. | 360/125.57 |
| 6,901,651 B2 * | 6/2005 | Sato et al. | 29/603.07 |
| 6,903,900 B2 * | 6/2005 | Sato et al. | 360/125.12 |
| 7,193,815 B1 * | 3/2007 | Stoev et al. | 360/125.12 |
| 7,193,816 B2 * | 3/2007 | Sasaki et al. | 360/125.12 |
| 2004/0240110 A1 * | 12/2004 | Matono | 360/126 |

FOREIGN PATENT DOCUMENTS

| | | |
|---|---|---|
| JP | A-62-057111 | 3/1987 |
| JP | 07-141621 | 6/1995 |
| JP | A-11-328615 | 11/1999 |
| JP | A-2002-100006 | 4/2002 |
| JP | A-2004-185742 | 7/2004 |
| JP | A-2004-295987 | 10/2004 |

\* cited by examiner

*Primary Examiner*—Mark Blouin
(74) *Attorney, Agent, or Firm*—Oliff & Berridge, PLC

(57) ABSTRACT

A perpendicular magnetic recording head capable of preventing information erasing without intention at the time of non-recording through making the magnetic domain structure of a pole layer appropriate is provided. A main pole layer is formed so as to include a first pole layer portion having a first width W1 which determines the recording track width of a recording medium and a length L1, a second pole layer portion having a width which gradually expands from the first width W1 to a second width W2 larger than the first width W1 (W2>W1) and a length L2, and a third pole layer portion having a third width W3 larger than the second width W2 (W3>W2) and a length L3. When the ratio W3/(L1+L2+L3) satisfies a relationship of W3/(L1+L2+L3)≧1.0, on the basis of the shape magnetic anisotropy of the main pole layer, the magnetic domain structure of the main pole layer is made appropriate so that an unnecessary magnetic flux is not easily leaked at the time of non-recording.

15 Claims, 18 Drawing Sheets

PERPENDICULAR MAGNETIC RECORDING HEAD AND MAGNETIC RECORDING APPARATUS

BACKGROUND OF THE INVENTION

1. Field of the Invention

The present invention relates to a perpendicular magnetic recording head including at least an inductive magnetic transducer for recording, and a magnetic recording apparatus including a perpendicular magnetic recording head.

2. Description of the Related Art

In recent years, an improvement in performance of a thin film magnetic head which is included in a magnetic recording apparatus such as a hard disk drive has been sought in accordance with an increase in the areal density of a magnetic recording medium (hereinafter simply referred to as "recording medium") such as a hard disk. As recording systems of the thin film magnetic head, for example, a longitudinal recording system in which a signal magnetic field is oriented in an in-plane direction (a longitudinal direction) of a recoding medium and a perpendicular recording system in which a signal magnetic field is oriented in a direction orthogonal to a surface of the recording medium are well known. At present, the longitudinal recording system is widely used, but in consideration of market forces in accordance with an improvement in areal density, it is assumed that the perpendicular recording system instead of the longitudinal recording system holds promise for the future, because the perpendicular recording system can obtain advantages that higher linear recording density can be achieved and that a recording medium on which information is recorded is not easily affected by thermal decay.

The perpendicular recording system thin film magnetic head (hereinafter simply referred to as "perpendicular magnetic recording head) includes, for example, a thin film coil generating a magnetic flux for recording, and a pole layer extending from an air bearing surface to the rear and guiding the magnetic flux to a recording medium so that the recording medium is magnetized in a direction orthogonal to a surface of the recording medium. In the perpendicular magnetic recording head, when a magnetic flux for recording is generated through passing a current through a thin film coil, the magnetic flux is emitted from the front end of the pole layer to generate a magnetic field for recording (a perpendicular magnetic field), so the surface of the recording medium is magnetized by the perpendicular magnetic field. Thereby, information is magnetically recorded on the recording medium.

Improvements in the performance of the thin film magnetic head are in increasing demand. In consideration of such a technical background, recently as means of improving the performance of the thin film magnetic head, for example, in addition to changing the recording system from a longitudinal recording system to a perpendicular recording system, an attempt to form the magnetic domain structure of the pole layer which performs a recording process appropriate. More specifically, for example, a thin film magnetic head including a pole layer which has a closure domain structure having a magnetic domain narrowed from the back end to the front end in order to secure better recording performance through smoothly transferring a magnetic flux is known (for example, refer to Japanese Unexamined Patent Application Publication No. H11-328615).

In order to secure the operating characteristics of the perpendicular magnetic recording head, for example, in order to prevent information erasing without intention at the time of non-recording, it is necessary to make the magnetic domain structure of the pole layer appropriate. The "information erasing without intention at the time of non-recording" means a failure that at the time of non-recording, that is, in a state where a thin film coil is not energized (a state where a magnetic flux for recording is not generated), information recorded on a recording medium is erased without intention because a magnetic flux remaining in the pole layer (residual magnetization) is leaked from an air bearing surface due to the magnetic domain structure of the pole layer as a portion where the magnetic flux for recording is emitted. However, in a related art, as described above, it is known that the magnetic domain structure of the pole layer has an influence on the smooth transfer of a magnetic flux, but sufficient knowledge about a causal relationship between the mechanism of information erasing without intention at the time of non-recording and the magnetic domain structure of the pole layer is not obtained, so how to set the magnetic domain structure of the pole layer for preventing information erasing without intention at the time of non-recording is an issue. Therefore, in order to secure the operating characteristics of the perpendicular magnetic recording head, the establishment of a technique to be able to prevent information erasing without intention at the time of non-recording through making the magnetic domain structure of the pole layer appropriate is desired.

SUMMARY OF THE INVENTION

In view of the foregoing, it is desirable to provide a perpendicular magnetic recording head and a magnetic recording apparatus which can prevent information erasing without intention at the time of non-recording through making the magnetic domain structure of a pole layer appropriate.

According to a first embodiment of the present invention, there is provided a perpendicular magnetic recording head including a thin film coil generating a magnetic flux; and a pole layer extending from an air bearing surface facing a recording medium to the rear, and guiding the magnetic flux to the recording medium so that the recording medium is magnetized in a direction orthogonal to a surface of the recording medium, wherein the pole layer includes a first pole layer portion, a second pole layer portion, and a third pole layer portion in order from the air bearing surface to the rear, the first pole layer portion having a first width W1 which determines the recording track width of the recording medium, the second pole layer portion having a width which gradually expands from the first width W1 to a second width W2 larger than the first width W1, and the third pole layer portion having a third width W3 larger than the second width W2.

According to a second embodiment of the present invention, there is provided a perpendicular magnetic recording head including a thin film coil generating a magnetic flux; a pole layer extending from an air bearing surface facing a recording medium to the rear, and guiding the magnetic flux to the recording medium so that the recording medium is magnetized in a direction orthogonal to a surface of the recording medium; a return yoke layer extending from the air bearing surface to the rear on a trailing side of the pole layer, and being connected to the pole layer on a side farther from the air bearing surface; and a write shield layer disposed in a region close to the air bearing surface between the pole layer and the return yoke layer so as to be separated from the pole layer by the gap layer, wherein the pole layer includes a first pole layer portion, a second pole layer portion, and a third pole layer portion in order from the air bearing surface to the rear, the first pole layer portion having a first width W1 which determines the recording track width of the recording medium, the second pole layer portion having a width which gradually expands from the first width W1 to a second width W2 larger than the first width W1, and the third pole layer portion having a third width W3 larger than the second width W2.

In the perpendicular magnetic recording head according to the first and the second embodiments, the pole layer is formed so as to include the first pole layer portion having the first width W1 which determines the recording track width of the recording medium, the second pole layer portion having a width which gradually expands from the first width W1 to the second width W2 larger than the first width W1, and the third pole layer portion having the third width W3 larger than the second width W2 in order from the air bearing surface to the rear. In this case, for example, when the pole layer is formed so that the ratio W3/(L1+L2+L3) between the third width W3 and the summation L1+L2+L3 of the first, the second and the third lengths satisfies a relationship of W3/(L1+L2+L3)≧1.0, on the basis of the shape magnetic anisotropy of the pole layer, the magnetic domain structure of the pole layer is determined so that a magnetization component in a direction crossing a direction where a magnetic flux is emitted at the time of recording becomes dominant. Thereby, the magnetic domain structure of the pole layer is made appropriate so that an unnecessary magnetic flux is not easily leaked from the pole layer at the time of non-recording. Therefore, when the magnetic domain structure of the pole layer is made appropriate, information erasing without intention at the time of non-recording can be prevented.

According to an embodiment of the present invention, there is provided a magnetic recording apparatus including a recording medium; and a perpendicular magnetic recording head recording information on the recording medium, wherein the perpendicular magnetic recording head includes a thin film coil generating a magnetic flux; and a pole layer extending from an air bearing surface facing a recording medium to the rear, and guiding the magnetic flux to the recording medium so that the recording medium is magnetized in a direction orthogonal to a surface of the recording medium, wherein the pole layer includes a first pole layer portion, a second pole layer portion, and a third pole layer portion in order from the air bearing surface to the rear, the first pole layer portion having a first width W1 which determines the recording track width of the recording medium, the second pole layer portion having a width which gradually expands from the first width W1 to a second width W2 larger than the first width W1, and the third pole layer portion having a third width W3 larger than the second width W2.

The magnetic recording apparatus according to the embodiment of the invention includes the above-described perpendicular magnetic recording head, so in the perpendicular magnetic recording head, the magnetic domain structure of the pole layer is made appropriate so that an unnecessary magnetic flux is not easily leaked at the time of non-recording. Therefore, as the perpendicular magnetic recording head in which the magnetic domain structure of the pole layer is made appropriate is included, information erasing without intention at the time of non-recording can be prevented.

In the perpendicular magnetic recording head according to the first embodiment of the invention, it is preferable that as a length in an extending direction of the pole layer, the first, the second and the third pole layer portions have a first length L1, a second length L2 and a third length L3, respectively, and the ratio W3/(L1+L2+L3) between the third width W3 and the summation L1+L2+L3 of the first, the second and the third lengths satisfies a relationship of W3/(L1+L2+L3)≧1.0. In this case, it is preferable that the ratio W3/L3 between the third width W3 and the third length L3 satisfies a relationship of W3/L3≧1.0, and the ratio W2/W3 between the second width W2 and the third width W3 satisfies a relationship of W2/W3≦0.7, and the summation L1+L2 of the first and the second lengths satisfies a relationship of 0.5 μm≦(L1+L2)≦5.0 μm.

Moreover, in the perpendicular magnetic recording head according to the first embodiment of the invention, an exposed surface exposed to the air bearing surface of the main pole layer may have a trapezoidal shape in which a long side positioned on a trailing side and a short side positioned on a leading side are an upper base and a lower base, respectively.

The perpendicular magnetic recording head according to the first embodiment of the invention may further include a magnetic layer extending from the air bearing surface to the rear on a trailing side of the pole layer, the magnetic layer being separated from the pole layer by a gap layer on a side closer to the air bearing surface, and being connected to the pole layer on a side farther from the air bearing surface. In this case, the magnetic layer may include a first magnetic layer portion being separated from the pole layer by the gap layer, and a second magnetic layer portion extending from the air bearing surface to the rear on a trailing side of the first magnetic layer portion, the second magnetic layer portion being connected to the first magnetic layer portion on a side closer to the air bearing surface and being connected to the pole layer on a side farther from the air bearing surface. In particular, it is preferable that the maximum width of the exposed surface exposed to the air bearing surface of the magnetic layer is larger than the maximum width of the exposed surface exposed to the air bearing surface of the pole layer, and the width on a trailing side of the exposed surface exposed to the air bearing surface of the pole layer is 0.2 μm or less, and the square measure of the exposed surface exposed to the air bearing surface of the magnetic layer is 7 μm² or more. In particular, a relationship of Y≧{7X/[9000×10³/(4π)]}×Z is preferably established, where the saturated magnetic flux density of the magnetic layer is X[T(tesla)], the magnetic square measure of the exposed surface exposed to the air bearing surface of the magnetic layer is Y[μm²T], and the maximum value of the strength of a magnetic field magnetizing the recording medium is Z[×10³/(4π)A/m]. In this case, "the magnetic square measure" is represented by the square measure of the exposed surface of the magnetic layer [μm²]× the saturated magnetic flux density of the magnetic layer [T].

In the perpendicular magnetic recording head according to the second embodiment of the invention, the write shield layer may be exposed to the air bearing surface, and be connected to the return yoke layer.

In the magnetic recording apparatus according to the embodiment of the invention, the recording medium may include a magnetized layer and a soft magnetic layer which are laminated.

Other and further objects, features and advantages of the invention will appear more fully from the following description.

DETAILED DESCRIPTION OF THE PREFERRED EMBODIMENTS

A preferred embodiment will be described in detail below referring to the accompanying drawings.

Figure 1B:
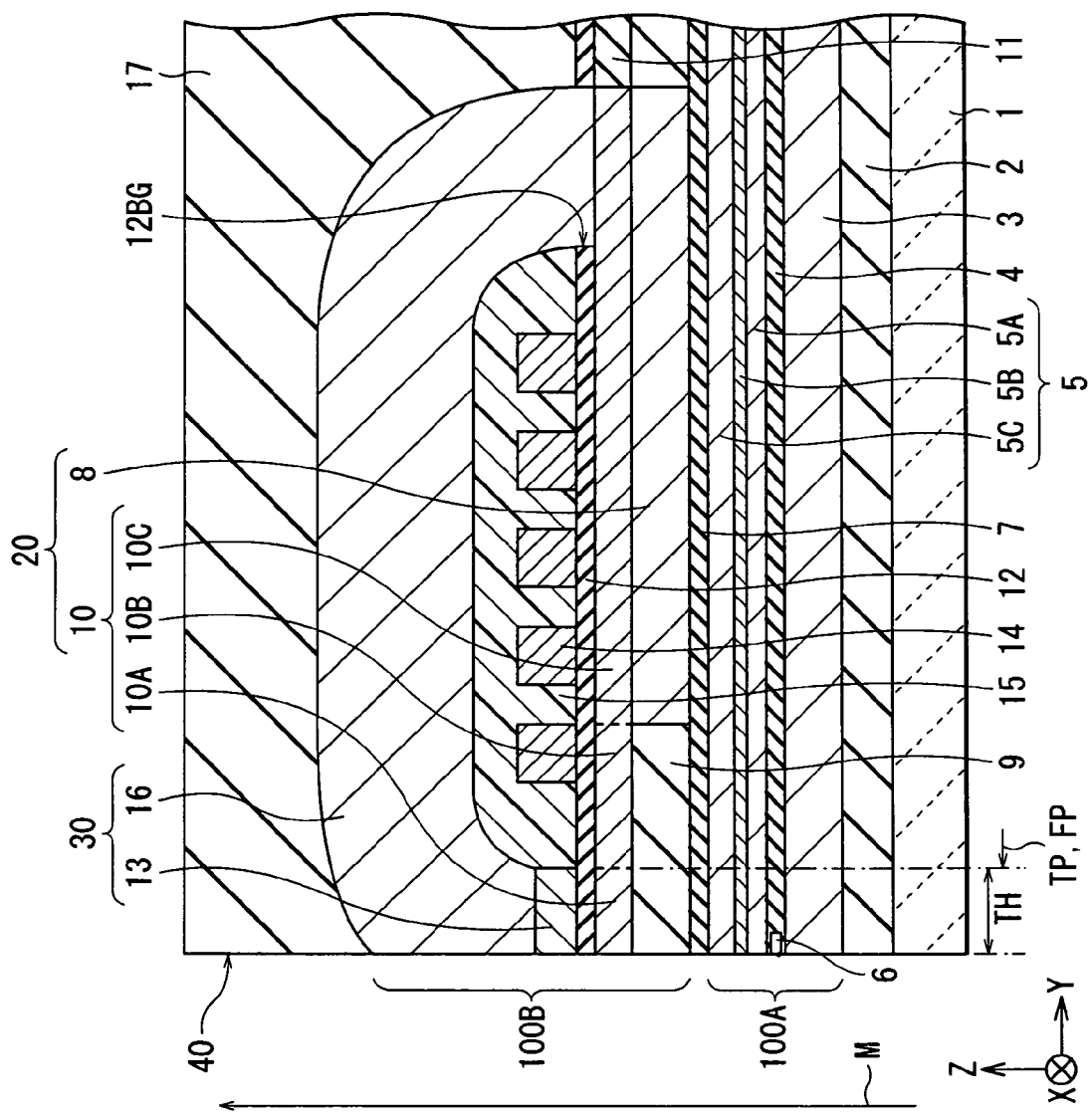
FIGS. 1A and 1B are sectional views of a thin film magnetic head including a perpendicular magnetic recording head according to an embodiment of the invention.
Figure 1A:
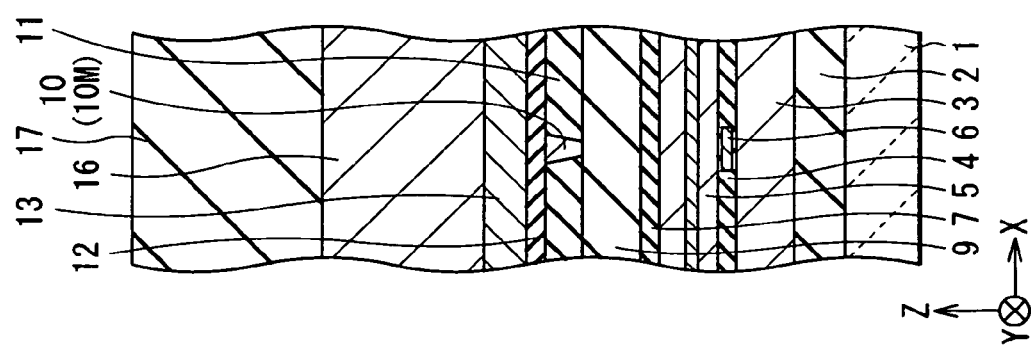
Figure 2:
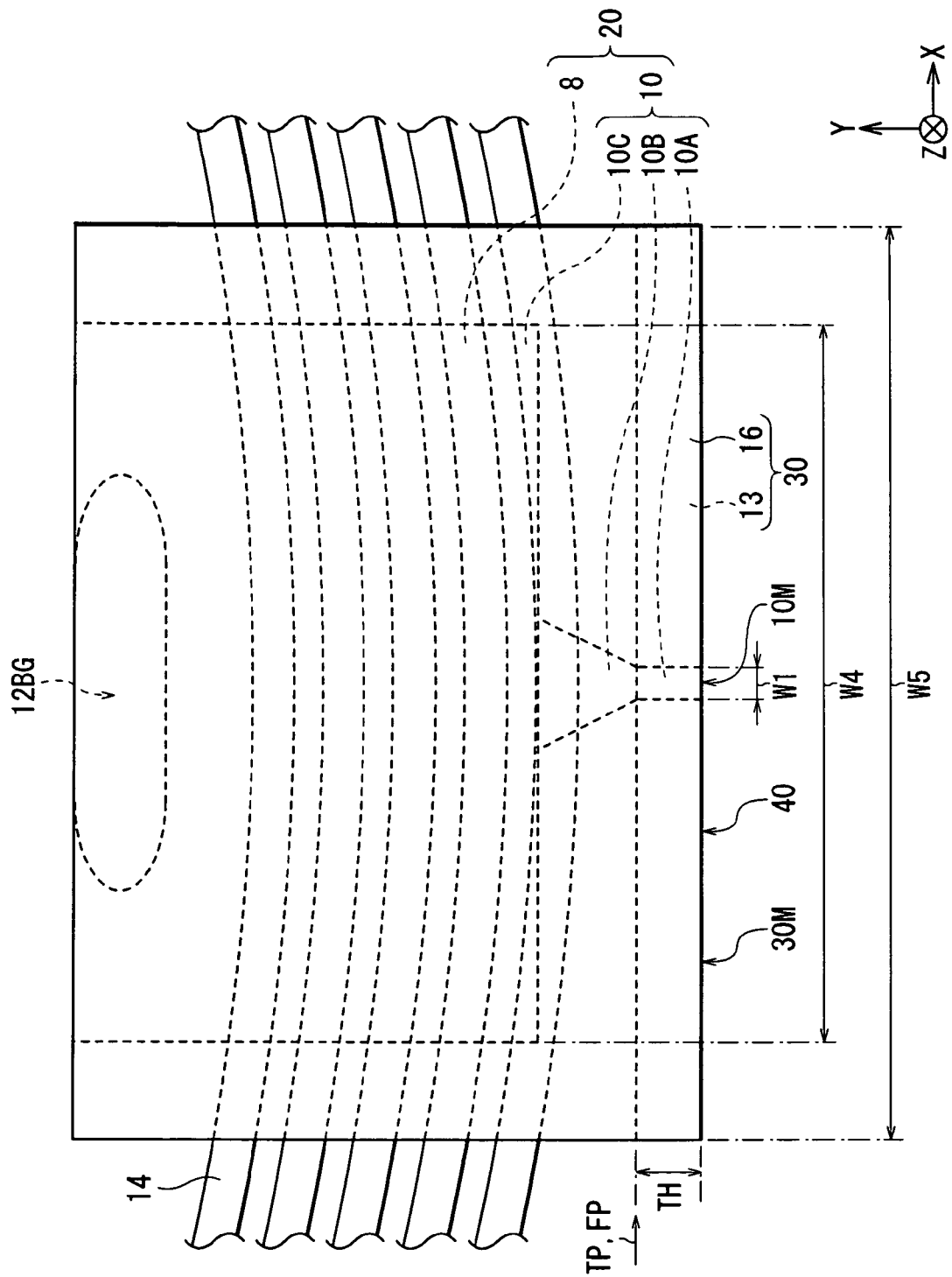
FIG. 2 is a plan view of a main part of the thin film magnetic head shown in FIGS. 1A and 1B.
Figure 3:
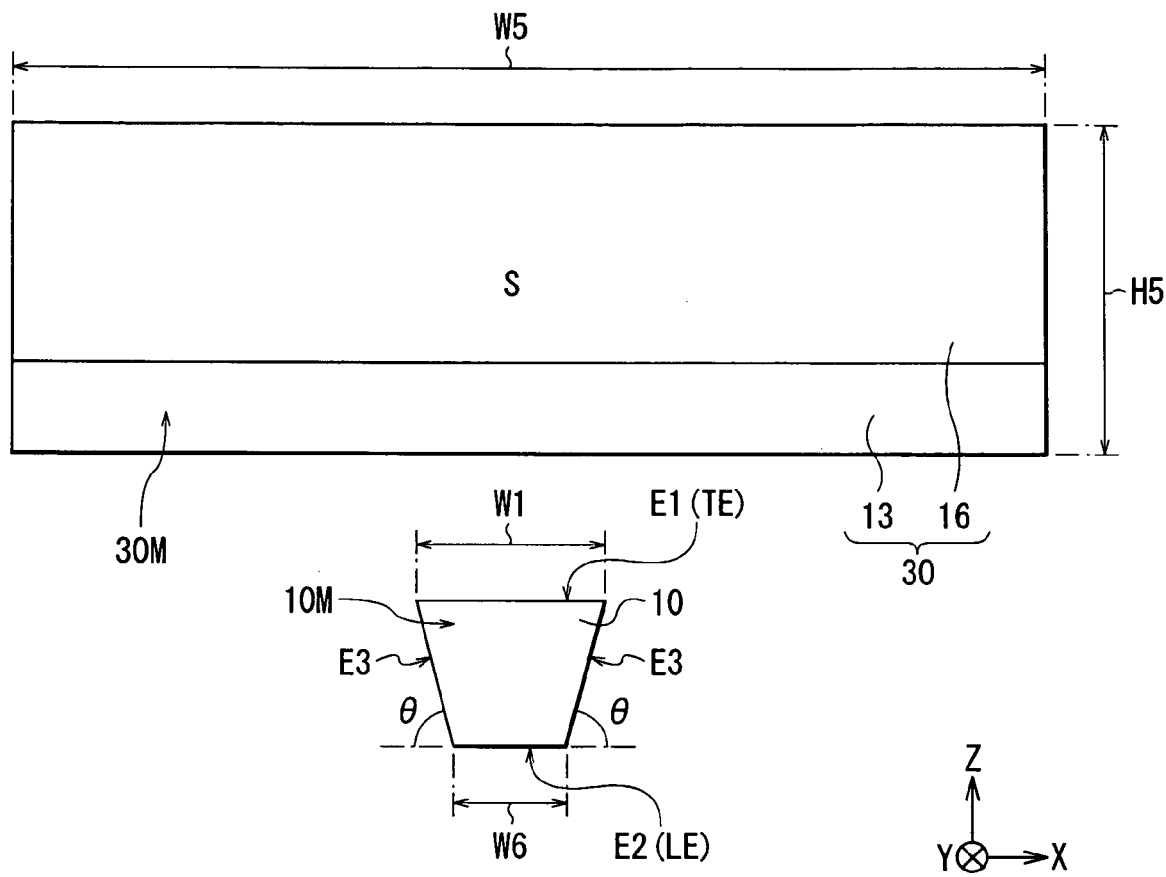
FIG. 3 is a plan view of an exposed surface as a main part of the thin film magnetic head shown in FIGS. 1A and 1B.
Figure 4:
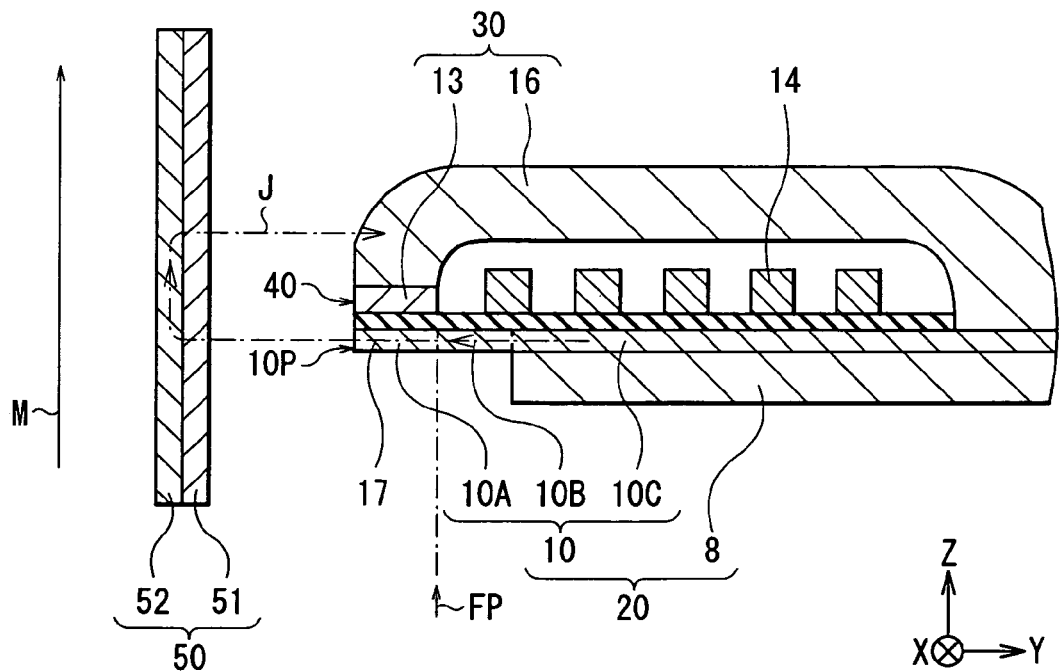
FIG. 4 is a schematic sectional view of a main part of the thin film magnetic head shown in FIGS. 1A and 1B.

At first, referring to FIGS. 1A and 1B through 4, the structure of a thin film magnetic head including a perpendicular magnetic recording head according to an embodiment of the invention will be described below. FIGS. 1A and 1B through 4 show the structure of the thin film magnetic head. FIGS. 1A and 1B show sectional views of the whole structure, and FIG. 2 shows a plan view of a main part (viewed from a Z-axis direction). FIG. 3 shows a plan view of an exposed surface as a main part (viewed from a Y-axis direction), and FIG. 4 shows a schematic sectional view of a main part. FIG. 1A shows a sectional view parallel to an air bearing surface (a sectional view along an XZ plane), and FIG. 1B shows a sectional view perpendicular to the air bearing surface (a sectional view along a YZ plane). An up arrow M shown in FIGS. 1A, 1B and 4 indicates a direction where a recording medium 50 relatively moves with respect to the thin film magnetic head (a medium travel direction). Moreover, in FIG. 4, the recording medium 50 which is subjected to a magnetic process by the thin film magnetic head is shown together with the thin film magnetic head.

In the following description, a dimension in an X-axis direction, a dimension in a Y-axis direction and a dimension in a Z-axis direction in FIGS. 1A and 1B through 4 are expressed as "width", "length" and "thickness or height", respectively. The "width" means a width in a so-called recording track width direction. Further, a side closer to the air bearing surface in the Y-axis direction is expressed as "front", and the opposite side is expressed as "rear". The same expressions are used in FIG. 5 and later drawings.

For example, as shown in FIGS. 1A and 1B through 4, the thin film magnetic head is included in a magnetic recording apparatus such as a hard disk drive to perform a magnetic process on the recording medium 50 such as a hard disk which moves in a medium travel direction M. More specifically, the thin film magnetic head is a composite head capable of performing a recording process and a reproducing process as the magnetic process, and as shown in FIGS. 1A and 1B, the thin film magnetic head has a structure in which an insulating layer 2 made of, for example, a non-magnetic insulating material such as aluminum oxide ($Al_2O_3$; hereinafter simply referred to as "alumina"), a reproducing head portion 100A which performs the reproducing process through the use of a magnetoresistive (MR) effect, a separating layer 7 made of, for example, a non-magnetic insulating material such as alumina, a recording head portion 100B which performs the recording process by a perpendicular recording system, and an overcoat layer 17 made of, for example, a non-magnetic insulating material such as alumina are laminated in this order on a substrate 1 made of, for example, a ceramic material such as AlTiC ($Al_2O_3 \cdot TiC$).

The reproducing head portion 100A has, for example, a laminate structure in which a bottom read shield layer 3, a shield gap film 4 and a top read shield layer 5 are laminated in this order. An MR device 6 as a reproducing device is buried in the shield gap film 4 so that an end surface of the MR device 6 is exposed to an air bearing surface 40 facing the recording medium 50.

The bottom read shield layer 3 and the top read shield layer 5 are provided to magnetically separate the MR device 6 from its surroundings, and they extend from the air bearing surface 40 to the rear. The bottom read shield layer 3 is made of, for example, a magnetic material such as a nickel-iron alloy (NiFe (for example, Ni: 80 wt %, Fe: 20 wt %); hereinafter simply referred to as "Permalloy (trade name)") with a thickness of approximately 1.0 μm to 2.0 μm. The top read shield layer 5 has, for example, a laminate structure (a three-layer structure) in which a top read shield layer portion 5A made of a magnetic material such as Permalloy, a non-magnetic layer 5B made of a non-magnetic material such as ruthenium (Ru) or alumina and a top read shield layer portion 5C made of a magnetic material such as Permalloy are laminated in this order. The top read shield layer 5 does not necessarily have a laminate structure, and may have a single-layer structure.

The shield gap film 4 is provided to electrically separate the MR device 6 from its surroundings, and is made of a non-magnetic insulating material such as alumina.

The MR device 6 is provided to perform a magnetic process (a reproducing process) through the use of, for example, a giant magnetoresistive (GMR) effect, a tunneling magnetoresistive (TMR) effect or the like.

The recording head portion 100B is a perpendicular magnetic recording head having, for example, a laminate structure in which a pole layer 20 of which surroundings are filled with insulating layers 9 and 11, a gap layer 12 having an opening for magnetic connection (a back gap 12BG), a thin film coil 14 covered with an insulating layer 15, and a magnetic layer 30 are laminated in this order, and is a so-called shield type head. In FIG. 2, only the thin film coil 14, the pole layer 20 and the magnetic layer 30 of the recording head portion 100B as main parts are shown.

The pole layer 20 is provided to perform a magnetic process (a recording process) through containing a magnetic flux for recording generated in the thin film coil 14, and then emitting the magnetic flux toward the recording medium 50, and more specifically, the pole layer 20 guides the magnetic flux to the recording medium 50 so that the recording medium 50 is magnetized in a direction orthogonal to its surface in order to perform a perpendicular recording system recording process. The pole layer 20 is disposed on a leading side of the thin film coil 14, and extends from the air bearing surface 40 to the rear, and more specifically extends to a position corresponding to the back gap 12BG disposed in the gap layer 12. When the movement of the recording medium 50 toward the medium travel direction M shown in FIGS. 1A, 1B and 4 is considered as a flow, the "leading side" means a side where the flow incomes (opposite to the medium travel direction M), and in this case, the leading side is a bottom side in a thickness direction (a Z-axis direction). On the other hand, a side where the flow outgoes (the medium travel direction M) is called "trailing side", and in this case, the trailing side is a top side in the thickness direction.

For example, as shown in FIGS. 1A and 1B, the pole layer 20 has a laminate structure in which the an auxiliary pole layer 8 of which surroundings are filled with the insulating layer 9 and a main pole layer 10 of which surroundings are filled with the insulating layer 11 are laminated in this order, that is, a two-layer structure in which the auxiliary pole layer 8 is disposed on a leading side, and the main pole layer 10 is disposed on a trailing side.

The auxiliary pole layer 8 functions as a main magnetic flux containing portion, and is disposed adjacent to the main pole layer 10 so as to be connected to the main pole layer 10. For example, the auxiliary pole layer 8 extends from a position at the rear of the air bearing surface 40 to the rear, more specifically to a position corresponding to the back gap 12BG, and the auxiliary pole layer 8 is made of, for example, a magnetic material with a high saturated magnetic flux density such as an iron-cobalt-based alloy. Examples of the iron-cobalt-based alloy include an iron-cobalt alloy (FeCo), an iron-cobalt-nickel alloy (FeCoNi) and so on. In the description, "connected" means while physically coming into contact with something to be connected, being magnetically connected so as to be able to bring in conduction, and the meaning of "connected" is the same in the following description. In particular, "physically coming into contact" in a structural relationship between the auxiliary pole layer 8 and the main pole layer 10 means not only the case where no layer is disposed between the auxiliary pole layer 8 and the main pole layer 10, that is, the auxiliary pole layer 8 and the main pole layer 10 are literally adjacent to each other so as to directly come into contact with each other but also the case where when the main pole layer 10 is formed, for example, by a plating process, a seed layer (made of, for example, titanium (Ti), ruthenium (Ru), tantalum (Ta) or the like with a thickness of approximately 50.0 nm) is disposed as a base layer for the main pole layer 10 because of a process factor in the plating process (the seed layer is sandwiched between the auxiliary pole layer 8 and the main pole layer 10), that is, the auxiliary pole layer 8 and the main pole layer 10 are indirectly in contact with each other with the seed layer in between. For example, as shown in FIG. 2, the auxiliary pole layer 8 has a rectangular planar shape with a width W4.

The main pole layer 10 functions as a main magnetic flux emitting portion, and is disposed adjacent to the auxiliary pole layer 8 so as to be connected to the auxiliary pole layer 8. The main pole layer 10 extends from the air bearing surface 40 to the rear, more specifically to a position corresponding to the back gap 12BG, and the main pole layer 15 is made of, a magnetic material with a high saturated magnetic flux density such as an iron-cobalt-based alloy as in the case of the auxiliary pole layer 8.

In particular, the main pole layer 10 has an exposed surface 10M exposed to the air bearing surface 40, and as shown in FIG. 3, for example, the exposed surface 10M has a planar shape determined by a top edge E1 on a trailing side, a bottom edge E2 on a leading side and two side edges E3. More specifically, for example, the exposed surface 10M has, for example, a shape in which the width is gradually reduced from the trailing side to the leading side, that is, a symmetrical inverted trapezoidal shape which has the top edge E1 (so-called trailing edge TE; long side) with a width W1 as an upper base and the bottom edge E2 (so-called leading edge LE) with a width W6 smaller than the width W1 (W6<W1; short side) as a lower base. The top edge E1 (trailing edge TE) of the main pole layer 10 is an actual recording point in the pole layer 20, and the width W1 of the top edge E1 is approximately 0.2 μm or less. In the planar shape of the exposed surface 10M, an angle θ between an extending direction of the bottom edge E2 and the side edges E3 can be freely set within a range of, for example, less than 90°. The structure of the main pole layer 10 will be described in detail later (refer to FIG. 5 which will be described later).

The insulating layer 9 is provided to electrically separate the auxiliary pole layer 8 from its surroundings. The insulating layer 9 is made of, for example, a non-magnetic insulating material such as alumina. The insulating layer 11 is provided to electrically separate the main pole layer 10 from its surroundings. The insulating layer 11 is made of, for example, a non-magnetic insulating material such as alumina.

The gap layer 12 forms a gap for magnetically separating between the pole layer 20 and the magnetic layer 30. The gap layer 12 is made of, for example, a non-magnetic insulating material such as alumina or a non-magnetic conductive material such as ruthenium (Ru) with a thickness of approximately 40.0 nm.

The thin film coil 14 generates a magnetic flux for recording, and is made of, for example, a high conductive material such as copper (Cu). For example, as shown in FIGS. 1A, 1B and 2, the thin film coil 14 has a winding structure (a spiral structure) in which the thin film coil 14 is wound around the back gap 12BG. In FIGS. 1A, 1B and 2, only a part of a plurality of turns of the thin film coil 14 is shown.

The insulating layer 15 is provided to electrically separate the thin film coil 14 from its surroundings, and is disposed on the gap layer 12 so as to prevent the back gap 12GB from being filled with the insulating layer 15. The insulating layer 15 is made of, for example, a non-magnetic insulating material such as a photoresist or spin-on glass (SOG) exhibiting liquidity by heating, and a near-edge portion of the insulating layer 15 has a rounded inclined surface which goes down to the edge. The forefront end position of the insulating layer 15 is "a throat height zero position TP" which is one of important factors in determining the recording performance of the thin film magnetic head, and a distance between the air bearing surface 40 and the throat height zero position TP is a so-called "throat height TH".

The magnetic layer 30 takes a spread portion of the magnetic flux for recording emitted from the pole layer 20 so as to increase the gradient of the perpendicular magnetic field, and takes a magnetic flux after recording (a magnetic flux used for recording) so as to circulate the magnetic flux between the recording head portion 100B and the recording medium 50. The magnetic layer 30 is disposed on the trailing side of the thin film coil 14, that is, on the trailing side of the pole layer 20, and extends from the air bearing surface 40 to the rear so that the magnetic layer 30 is separated from the pole layer 20 by the gap layer 12 on a side closer to the air bearing surface 40, and is connected to the pole layer 20 through the back gap 12BG on a side farther from the air bearing surface 40.

The magnetic layer 30 has an exposed surface 30M exposed to the air bearing surface 40. For example, as shown in FIG. 3, the exposed surface 30M has a height H5 and a width W5, and has a rectangular shape (with a square measure S). For example, the maximum width (the width W5) of the exposed surface 30M is larger than the maximum width (the width W1) of the exposed surface 10M (W5>W1). Moreover, for example, as described above, when the width W1 of the top edge E1 (the trailing edge TE) of the main pole layer 10 is 0.2 μm or less, the square measure S of the exposed surface 30M is approximately 7 μm$^2$ or more, preferably approximately 12.25 μm$^2$ or more, and more preferably approximately 70 μm$^2$ or more. In this case, for example, a relationship of $Y \geq \{7X/[9000 \times 10^3/(4\pi)]\} \times Z$ is preferably established, where the saturated magnetic flux density of the magnetic layer 30 is X[T], the magnetic square measure of the exposed surface 30M is Y[μm$^2$T], and the maximum value of the strength of the perpendicular magnetic field which magnetizes the recording medium 50 is $Z[\times 10^3/(4\pi)$A/m].

In particular, the magnetic layer 30 includes, for example, a write shield layer 13 (a first magnetic layer portion) and a return yoke layer 16 (a second magnetic layer portion) which are separate bodies, and the magnetic layer 30 has a structure in which the write shield layer 13 and the return yoke layer 16 are connected to each other.

The write shield layer 13 has a function of taking the above-described spread portion of the magnetic flux. The write shield layer 13 may have a function of taking the above-described magnetic flux after recording as in the case of the return yoke layer 16. The write shield layer 13 is disposed in a region near the air bearing surface 40 between the pole layer 20 and the return yoke layer 16 so as to be separated from the pole layer 20 by the gap layer 12. In other words, for example, as shown in FIGS. 1A and 1B, while the write shield layer 13 is disposed adjacent to the gap layer 12 to be separated from the pole layer 20 by the gap layer 12, the write shield layer 13 extends from the air bearing surface 40 to a position between the air bearing surface 40 and the back gap 12BG, more specifically to a position between the air bearing surface 40 and the thin film coil 14. The write shield layer 13 is made of, for example, a magnetic material with a high saturated magnetic flux density such as Permalloy or an iron-cobalt-based alloy, and for example, as shown in FIG. 2, the write shield layer 13 has a rectangular planar shape with the width W5 larger than the width W4 of the auxiliary pole layer 8 (W5>W4). The write shield layer 13 is adjacent to the insulating layer 15 in which the thin film coil 14 is buried, that is, the write shield layer 13 acts a role which determines the throat height TH on the basis of the throat height zero position TP through determining the forefront end position of the insulating layer 15 (a position of an edge nearest to the air bearing surface 40; the throat height zero position TP).

The return yoke layer 16 has a function of taking the above-described magnetic flux after recording. For example, as shown in FIGS. 1A and 1B, the return yoke layer 16 extends from the air bearing surface 40 to a position corresponding to the back gap 12BG at the rear of the air bearing surface 40 on the trailing side of the write shield layer 13, and the return yoke layer 16 is connected to the write shield layer 13 on a side closer to the air bearing surface 40, and is connected to the pole layer 20 via the back gap 12BG on a side farther from the air bearing surface 40. The return yoke layer 16 is made of, for example, a magnetic material with a high saturated magnetic flux density such as Permalloy or an iron-cobalt-based alloy as in the case of the write shield layer 13, and as shown in FIG. 2, the return yoke layer 16 has a rectangular planar shape with the width W5.

For example, as shown in FIG. 4, the recording medium 50 includes a magnetized layer 51 and a soft magnetic layer 52 which are laminated, and the magnetized layer 51 is disposed so as to face the air bearing surface 40. The magnetized layer 51 is a layer on which information is magnetically recorded, and the soft magnetic layer 52 functions as a magnetic flux flow path (so-called flux path). The recording medium 50 including the magnetized layer 51 and the soft magnetic layer 52 is generally called "two-layer recording medium" for perpendicular recording.

Figure 5:
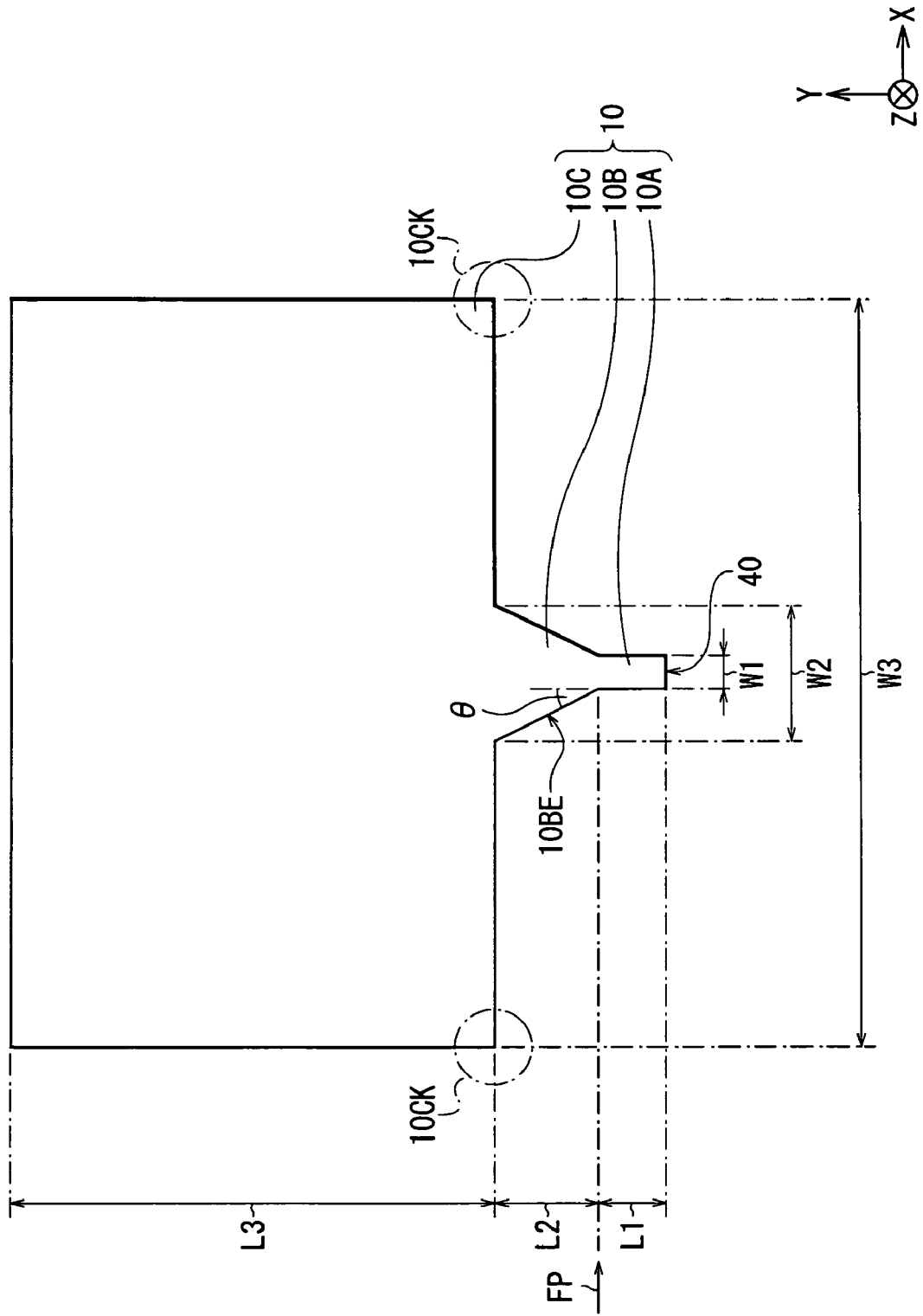
FIG. 5 is a plan view of a main pole layer of the thin film magnetic head shown in FIGS. 1A and 1B.

Next, referring to FIGS. 4 and 5, the structure of the main pole layer 10 will be described in detail below. FIG. 5 shows a plan view of the main pole layer 10, and corresponds to FIG. 2.

For example, as shown in FIGS. 4 and 5, the main pole layer 10 has a substantially battledore-like planar shape as a whole. In other words, for example, the main pole layer 10 includes a front end portion 10A (a first pole layer portion) which has the width W1 (a first width) determining the recording track width of the recording medium 50, a middle portion 10B (a second pole layer portion) which has a width gradually expands from the width W1 to a width W2 larger than the width W1 (a second width; W2>W1), and a rear end portion 10C which has a width W3 larger than the width W2 (a third width W3, W3>W2) in order from the air bearing surface 40 to the rear, and the main pole layer 10 has a combined structure in which the front end portion 10A, the middle portion 10B and the rear end portion 10C are connected to one another. A position where the width of the main pole layer 10 expands from the front end portion 10A to the middle portion 10B, that is, a position where the expansion of the width of the main pole layer 10 starts from the width W1 which determines the recording track width of the recording medium 50 is "a flare point FP" which is one of important factors in determining the recording performance of the thin film magnetic head. For example, FIGS. 1A, 1B and 2 show the case where the throat height zero position TP matches the flare point FP.

The front end portion 10A is a portion where a magnetic flux for recording generated in the thin film coil 14 is actually emitted toward the recording medium 50, and the front end portion 10A has a length L1. The "length" means a length in an extending direction of the pole layer 20. The front end portion 10A has the width W1 as a whole, that is, the width W1 of the front end portion 10A is uniform as a whole.

The middle portion 10B is a portion which supplies the magnetic flux contained in the auxiliary pole layer 8 to the front end portion 10A, and has a length L2. The width of the middle portion 10B gradually expands from the width W1 to the width W2, that is, the middle portion 10B has the width W1 in a position connected to the front end portion 10A, and the width W2 in a position connected to the rear end portion 10C. The middle portion 10B has two side edges 10BE which extend so as to be gradually separated from each other according to the expansion of the width, and for example, the side edges 10BE linearly extend. The expanding angle of the middle portion 10B, that is, an angle θ between an extending direction of the front end portion 10A (a Y-axis direction) and the side edges 10BE of the middle portion 10B is approximately 45° or less, and preferably approximately 30° to 45°.

The rear end portion 10C is a portion which supplies the magnetic flux contained in the auxiliary pole layer 8 to the front end portion 10A as in the case of the middle portion 10B, and has a length L3. The rear end portion 10C has the width W3 as a whole, that is, the width W3 of the rear end portion 10C is uniform as a whole. In particular, for example, the width W3 of the rear end portion 10C matches the width W4 (refer to FIG. 2) of the auxiliary pole layer 8 (W3=W4), and is smaller than the width W5 (refer to FIG. 2) of the magnetic layer 30 (the write shield layer 13 and the return yoke layer 16) (W3<W5).

In particular, in the main pole layer 10, for the purpose of securing operating characteristics of the perpendicular recording system recording head portion 100B, in order to prevent information erasing without intention at the time of non-recording, for example, as will be described later, each dimension of the main pole layer 10 is made appropriate so as to make the magnetic domain structure of the main pole layer 10 appropriate.

Firstly, the ratio W3/(L1+L2+L3) between the width W3 of the rear end portion 10C and the summation of the length L1 of the front end portion 10A, the length L2 of the middle portion 10B and the length L3 of the rear end portion 10C, that is, L1+L2+L3 satisfies a relationship of W3/(L1+L2+L3) ≧1.0. On the basis of the dimensional relationship, the width of the whole main pole layer 10 (=W3) is equal to or larger than the length of the whole main pole layer 10 (=L1+L2+L3) (W3≧(L1+L2+L3)), that is, the main pole layer 10 has a horizontally long planar shape (a shape with a side in an X-axis direction longer than a side in a Y-axis direction) as a whole in general. In FIGS. 2 and 5, for example, the case where a relationship of W3/(L1+L2+L3)>1.0 is established is shown.

Secondly, the ratio W3/L3 between the width W3 of the rear end portion 10C and the length L3 of the rear end portion 10C satisfies a relationship of W3/L3≧1.0. On the basis of the dimensional relationship, the width W3 of the rear end portion 10C is equal to or larger than the length L3 of the rear end portion 10C (W3≧L3), that is, the rear end portion 10C has a horizontally long planar shape (a shape with a side in an X-axis direction longer than a side in a Y-axis direction) as a whole in general. In FIGS. 2 and 5, for example, the case where a relationship of W3/L3>1.0 is established is shown.

Thirdly, the ratio W2/W3 between the width W2 of the middle portion 10B and the width W3 of the rear end portion 10C satisfies a relationship of W2/W3≦0.7. On the basis of the dimensional relationship, the width W2 of the middle portion 10B is 0.7 times or less the width W3 of the rear end portion 10C, that is, the width of the main pole layer 10 is locally narrowed in a connecting position between the middle portion 10B and the rear end portion 10C. The ratio W2/W3 more preferably satisfies a relationship of W2/W3≦0.37.

Fourthly, the summation L1+L2 of the length L1 of the front end portion 10A and the length L2 of the middle portion 10B satisfies a relationship of 0.5 μm≦(L1+L2)≦5.0 μm. On the basis of the dimensional relationship, the rear end portion 10C is recessed 0.5 μm to 5.0 μm from the air bearing surface 40. The summation L1+L2 more preferably satisfies a relationship of 0.7 μm≦(L1+L2)≦4.0 μm.

As an example of the dimension of each part of the above main pole layer 10, the width W1 is approximately 0.1 μm to 0.2 μm, the length L1 is 0.1 μm to 0.3 μm, the width W3 is approximately 15.0 μm to 30.0 μm, and the summation L1+L2+L3 is approximately 15.0 μm to 30.0 μm.

Next, referring to FIGS. 1A and 1B through 5, actions of the thin film magnetic head will be described below.

In the thin film magnetic head, at the time of recording information, when a current flows into the thin film coil 14 of the recording head portion 100B from an external circuit (not shown), a magnetic flux J for recording (refer to FIG. 5) is generated in the thin film coil 14. After the magnetic flux J generated at this time is contained in the pole layer 20 (the auxiliary pole layer 8 and the main pole layer 10), the magnetic flux J flows to the front end portion 10A of the main pole layer 10 in the pole layer 20. At this time, the magnetic flux J flowing through the pole layer 20 is concentrated at the flare point FP with a decrease in the width of the pole layer 20, so the magnetic flux J is focused on a portion of the exposed surface 10M of the front end portion 10A in proximity to the trailing edge TE. When the magnetic flux J focused on the portion in proximity to the trailing edge TE is emitted to outside, a magnetic field for recording (a perpendicular magnetic field) is generated in a direction orthogonal to a surface of the recording medium 50, and the magnetized layer 50 is magnetized in a perpendicular direction by the perpendicular magnetic field, so information is magnetically recorded on the recording medium 50.

Moreover, when the magnetic flux J is emitted from the pole layer 20, a spread portion of the magnetic flux J is taken in the write shield layer 13. Thereby, the spread of the magnetic flux J can be prevented so as to increase the gradient of the perpendicular magnetic field. The magnetic flux taken in the write shield layer 13 is provided to the pole layer 20 via the back gap 12BG again.

At the time of recording information, when the magnetic flux J is emitted from the pole layer 20 to the recording medium 50, the magnetic flux J magnetizes the magnetized layer 51, and then the magnetic flux J is taken in the return yoke layer 16 via the soft magnetic layer 52. At this time, a part of the magnetic flux J is taken in the write shield layer 13. The magnetic flux J taken in the write shield layer 13 and the return yoke layer 16 is provided to the pole layer 20 via the back gap 12BG again. Thereby, the magnetic flux J is circulated between the recording head portion 100B and the recording medium 50, so a magnetic circuit is established.

On the other hand, at the time of reproducing information, when a sense current flows through the MR device 6 of the reproducing head portion 100A, the resistance of the MR device 6 is changed according to a signal magnetic field for reproducing from the recording medium 50, so a change in the resistance of the MR device 6 is detected as a change in the sense current, thereby information recorded on the recording medium 50 is magnetically reproduced.

In the thin film magnetic head according to the embodiment, the main pole layer 10 is formed so as to include the front end portion 10A with the width W1 determining the recording track width of the recording medium 50, the middle portion 10B with a width gradually expanding from the width W1 to the width W2 larger than the width W1 (W2>W1), and the rear end portion 10C with the width W3 larger than the width W2 (W3>W2) in order from the air bearing surface 40 to the rear. In this case, for example, as described above, when the main pole layer 10 is formed so that the ratio W3/(L1+L2+L3) satisfies the relationship of W3/(L1+L2+L3)≧1.0, the magnetic domain structure of the main pole layer 10 is made appropriate because of the following reason, thereby information erasing without intention at the time of non-recording can be prevented.

Figure 6:
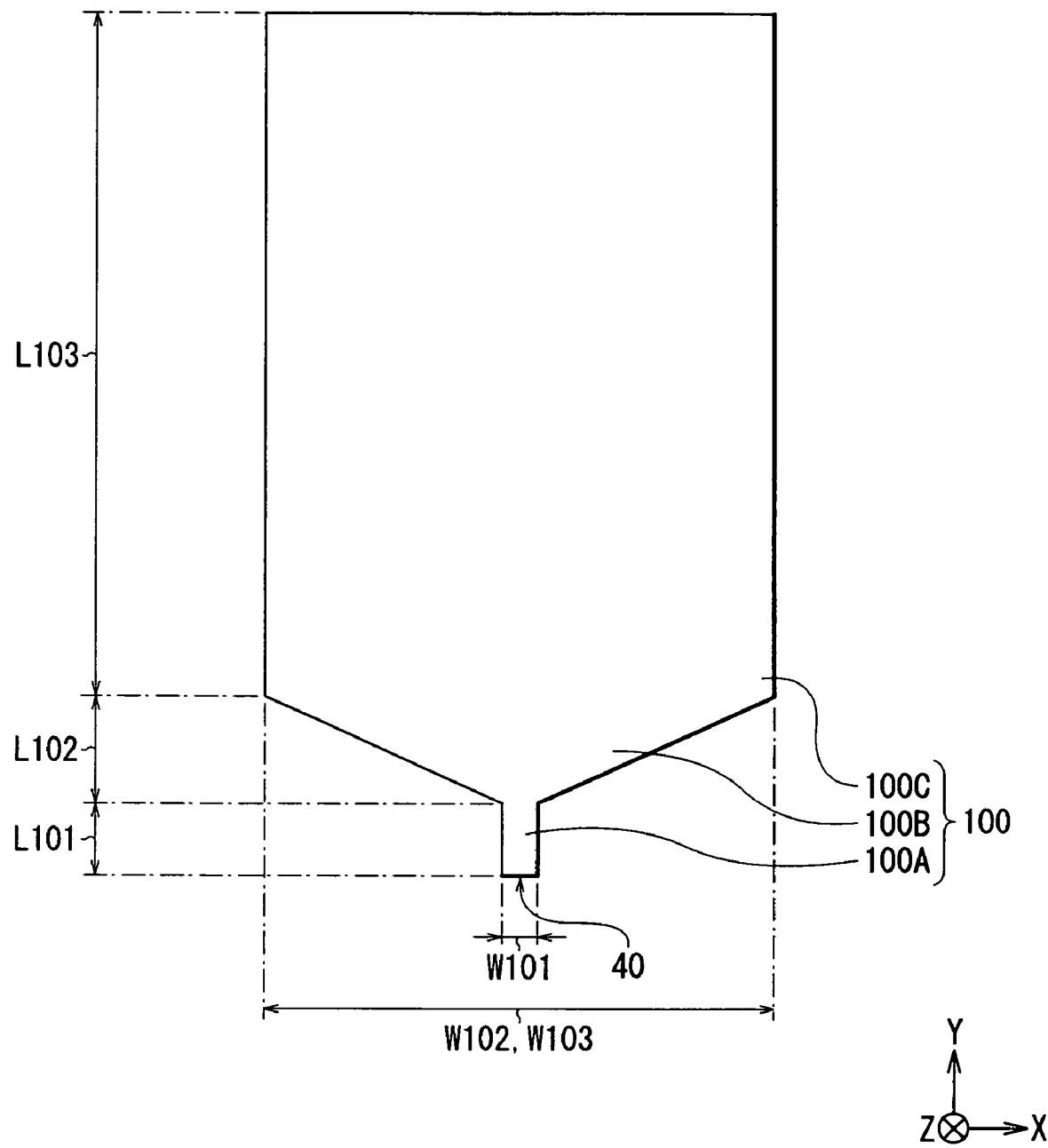
FIG. 6 is a plan view of a main pole layer of a thin film magnetic head of a comparative example relative to the thin film magnetic head according to the embodiment of the invention.
Figure 7:
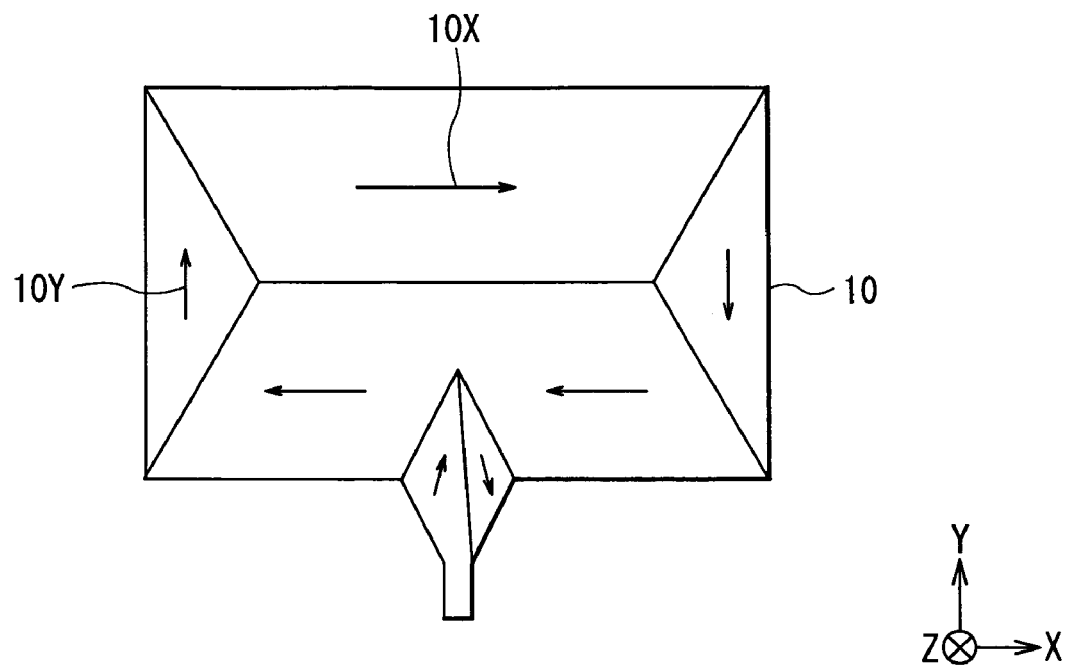
FIG. 7 is a plan view for describing the magnetic domain structure of the main pole layer of the thin film magnetic head according to the embodiment of the invention.
Figure 8:
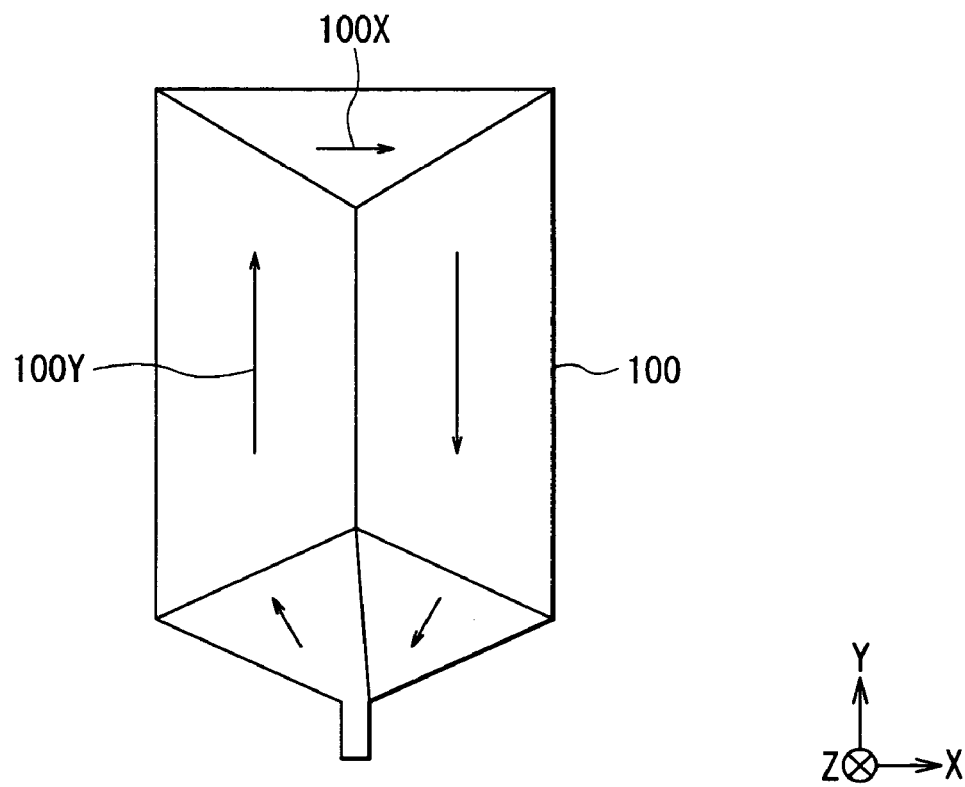
FIG. 8 is a plan view for describing the magnetic domain structure of the main pole layer of the thin film magnetic head of the comparative example.
Figure 9:
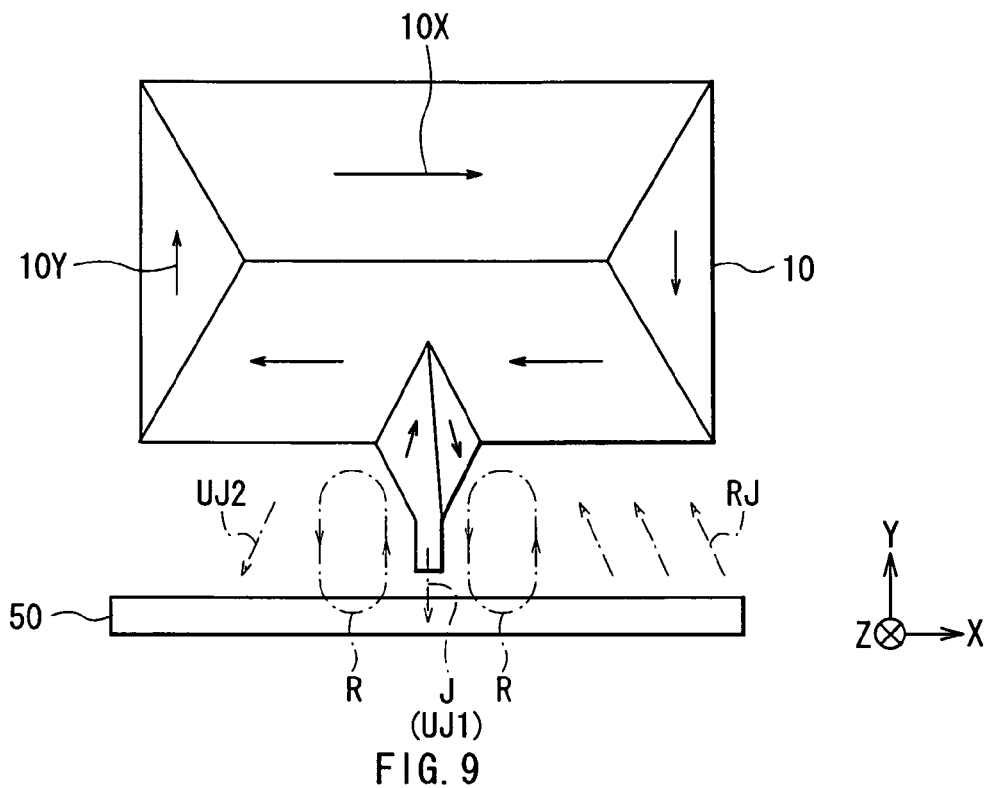
FIG. 9 is a plan view for describing an advantage of the thin film magnetic head according to the embodiment of the invention.
Figure 10:
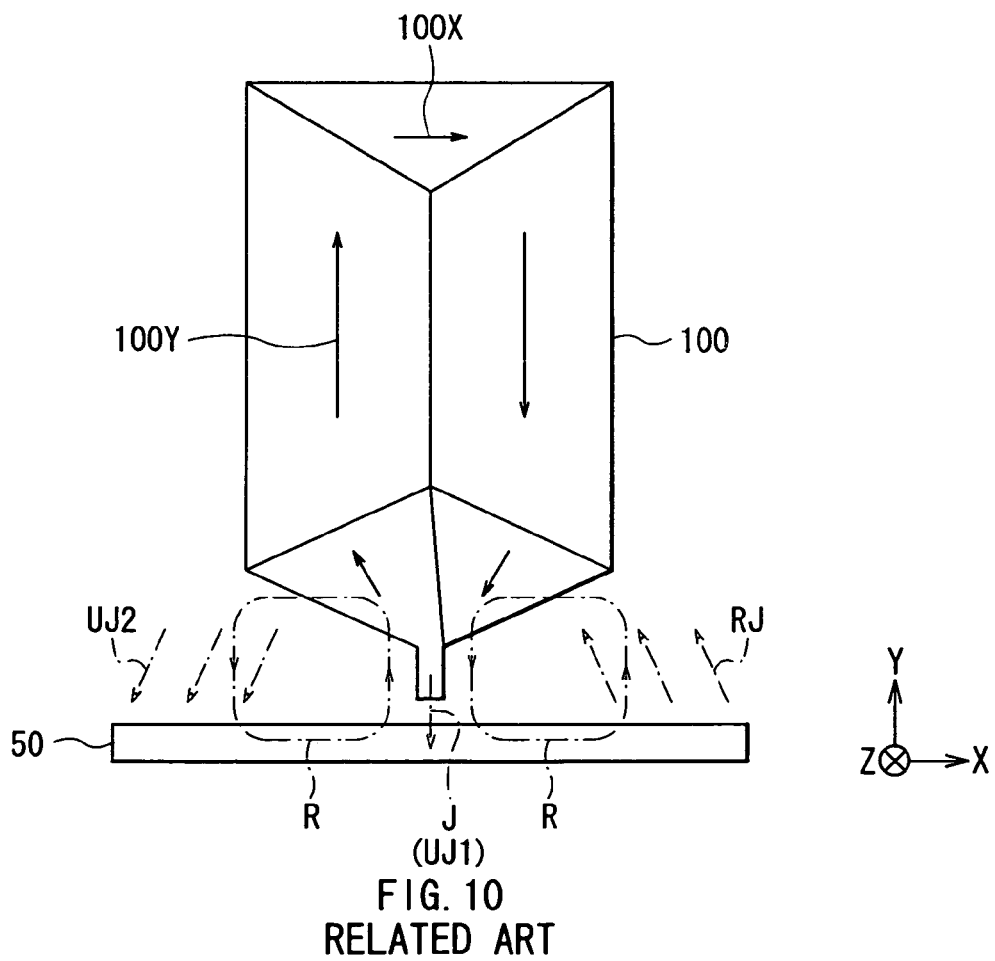
FIG. 10 is a plan view for describing a disadvantage of the thin film magnetic head of the comparative example.

FIG. 6 is an illustration for describing the structure of a thin film magnetic head as a comparative example relative to the thin film magnetic head according to the embodiment, and corresponds to FIG. 5. FIG. 7 is an illustration for describing the magnetic domain structure of the thin film magnetic head according to the embodiment, and corresponds to FIG. 5. FIG. 8 is an illustration for describing the magnetic domain structure of the thin film magnetic head of the comparative example, and corresponds to FIG. 6. FIG. 9 is an illustration for describing an advantage of the thin film magnetic head according to the embodiment, and corresponds to FIG. 7. FIG. 10 is an illustration for describing a disadvantage of the thin film magnetic head of the comparative example, and corresponds to FIG. 8. In FIGS. 9 and 10, the recording medium 50 is simplified.

As shown in FIG. 6, the thin film magnetic head of the comparative example has the same structure as that of the thin film magnetic head according to the embodiment (refer to FIGS. 1A and 1B through 5) except that the thin film magnetic head of the comparative example includes a main pole layer 100 (including a front end portion 100A (with a width W101 and a length L101), a middle portion 100B (with a width W102 and a length L102) and a rear end portion 100C (with a width W103 and a length L103)) corresponding to the main pole layer 10 (including the front end portion 10A (with the width W1 and the length L1), the middle portion 10B (with the width W2 and the length L2) and the rear end portion 10C (with the width W3 and the length L3)), and the width W102 of the middle portion 100B is equal to the width W103 of the rear end portion 100C (W102=W103), and the ratio W103/(L101+L102+L103) satisfies a relationship of W103/(L101+L102+L103)<1.0.

In the thin film magnetic head of the comparative example, as shown in FIG. 6, the main pole layer 100 has a vertically long planar shape (a shape with a side in a Y-axis direction longer than a side in an X-axis direction) as a whole because of the dimensional relationship that the ratio W103/(L101+L102+L103) satisfies the relationship of W103/(L101+L102+L103)<1.0, so the magnetic domain structure is determined on the basis of the shape magnetic anisotropy of the main pole layer 100 with a vertically long shape. More specifically, for example, as shown in FIG. 8, in the magnetic domain structure of the main pole layer 100, the share of a magnetization component 100Y parallel to a Y axis is larger than the share of a magnetization component 100X parallel to an X axis, that is, the magnetic domain structure of the main pole layer 100 is determined so that the magnetization component 100Y in a direction parallel to a direction where a magnetic flux is emitted at the time of recording (Y-axis direction) becomes dominant.

In this case, as shown in FIG. 10, in the case where after the magnetic flux J for recording is supplied from the main pole layer 100 to the recording medium 50 at the time of recording information, the supply of the magnetic flux J is suspended after recording information, because of the magnetic domain structure of the main pole layer 100 in which the magnetization component 100Y is dominant, the main pole layer 100 is susceptible to a magnetoelastic effect just after recording, so the magnetic flux J remaining in the main pole layer 100 is easily leaked to outside as an unnecessary magnetic flux UJ1 at the time of non-recording. Thereby, an unnecessary magnetic field is easily generated on the basis of the unnecessary magnetic flux UJ1, so information recorded on the recording medium 50 is easily erased without intention.

Moreover, in the case where after the magnetic flux J is supplied from the main pole layer 100 to the recording medium 50 at the time of recording information, the magnetic flux J is returned to the thin film magnetic head via the recording medium 50 as a return magnetic flux RJ after recording information, when the return magnetic flux RJ is taken in the main pole layer 100, the return magnetic flux RJ taken in the main pole layer 100 is easily supplied to the recording medium 50 again as an unnecessary magnetic flux UJ2 because of the magnetic domain structure of the main pole layer 100 in which the magnetization component 100Y is dominant. Moreover, at the time of non-recording, the magnetic flux J is easily circulated between the main pole layer 100 and the recording medium 50, that is, as indicated by a closed loop (magnetic closed loop) R with an arrow in FIG. 10, the amount of a generated unnecessary magnetic flux UJ2 and the range where the unnecessary magnetic flux UJ2 is generated increase. Thereby, an unnecessary magnetic field is easily generated on the basis of the unnecessary magnetic flux UJ2, so information recorded on the recording medium 50 is easily erased without intention.

Therefore, in the thin film magnetic head of the comparative example, in terms of preventing information recorded on the recording medium 50 from being erased without intention, the magnetic domain structure of the main pole layer 100 is not made appropriate due to the unnecessary magnetic fluxes UJ1 and UJ2, so it is difficult to prevent information erasing without intention at the time of non-recording through making the magnetic domain structure of the main pole layer 100 appropriate.

On the other hand, in the thin film magnetic head according to the embodiment, as shown in FIG. 5, on the basis of the dimensional relationship that the ratio W3/(L1+L2+L3) satisfies a relationship of W3/(L1+L2+L3)≧1.0, the main pole layer 10 has a horizontally long planar shape (a shape with a side in an X-axis direction longer than a side in a Y-axis direction) as a whole in general, so the magnetic domain structure is determined on the basis of the shape magnetic anisotropy of the main pole layer 10 with a horizontally long shape. More specifically, for example, as shown in FIG. 7, in the magnetic domain structure of the main pole layer 10, the share of a magnetization component 10X parallel to an X axis is larger than the share of a magnetization component 10Y parallel to a Y axis, that is, the magnetic domain structure of the main pole layer 10 is determined so that the magnetization component 10X in a direction crossing a direction where the magnetic flux is emitted at the time of recording (Y-axis direction) becomes dominant.

In this case, as shown in FIG. 9, in the case where after the magnetic flux J for recording is supplied from the main pole layer 10 to the recording medium 50 at the time of recording information, the supply of the magnetic flux J is suspended after recording information, on the basis of the magnetic domain structure of the main pole layer 10 in which the magnetization component 10X is dominant, the main pole layer 10 is impervious to a magnetoelastic effect just after recording, so the magnetic flux J remaining in the main pole layer 10 is not easily leaked to outside as the unnecessary magnetic flux UJ1 at the time of non-recording. Thereby, it is difficult to generate an unnecessary magnetic field on the basis of the unnecessary magnetic flux UJ1, so information recorded on the recording medium 50 is not easily erased without intention at the time of non-recording.

Moreover, in the case where after the magnetic flux J is supplied from the main pole layer 10 to the recording medium 50 at the time of recording information, the magnetic flux J is returned to the thin film magnetic head via the recording medium 50 as the return magnetic flux RJ after recording information, when the return magnetic flux RJ is taken in the main pole layer 10, on the basis of the magnetic domain structure of the main pole layer 10 in which the magnetization component 10X is dominant, the return magnetic flux RJ is not easily supplied to the recording medium 50 again as the unnecessary magnetic flux UJ2. Moreover, at the time of non-recording, the magnetic flux J is not easily circulated between the main pole layer 10 and the recording medium 50, that is, as shown by a closed loop (a magnetic closed loop) R with an arrow in FIG. 9, the amount of the generated unnecessary magnetic flux UJ2 and the range where the unnecessary magnetic flux UJ2 is generated are reduced. Thereby, it is difficult to generate an unnecessary magnetic field on the basis of the unnecessary magnetic flux UJ2, so information recorded on the recording medium 50 is not easily erased without intention.

Therefore, in the thin film magnetic head according to the embodiment, in terms of preventing information recorded on the recording medium 50 from being erased without intention due to the unnecessary magnetic fluxes UJ1 and UJ2, the magnetic domain structure of the main pole layer 10 is made appropriate, so when the magnetic domain structure of the main pole layer 10 is made appropriate, information erasing without intention at the time of non-recording can be prevented.

In particular, in the embodiment, as described above, the main pole layer 10 is formed so as to include the front end portion 10A (with the width W1), the middle portion 10B (with the width W2) and the rear end portion 10C (with the width W3) in order from the air bearing surface 40 to the rear, so there is a large difference in the volume to contain the magnetic flux (that is, a so-called magnetic volume) between the middle portion 10B and the rear end portion 10C. In other words, the magnetic volume of the middle portion 10B is much smaller than the magnetic volume of the rear end portion 10C, and the magnetic volume of the middle portion 10B is gradually reduced from a side near the rear end portion 10C to a side near the front end portion 10A. In this case, when the magnetic flux for recording flows through the main pole layer 10, when a sufficient amount of the magnetic flux is contained in the rear end portion 10C with a large magnetic volume, while the sufficient amount of the magnetic flux is concentrated according to a difference in the magnetic volume between the rear end portion 10C and the middle portion 10B, the magnetic flux flows from the rear end portion 10C to the middle portion 10B, and then while the magnetic flux is gradually concentrated according a decrease in the magnetic volume in a process in which the magnetic flux passes through the middle portion 10B, the magnetic flux flows into the front end portion 10A. Thereby, in the case where the sufficient amount of the magnetic flux is contained in the rear end portion 10C, a necessary amount of the magnetic flux is supplied from the rear end portion 10C to the front end portion 10A so as to prevent magnetic flux saturation, so an overwrite characteristic which is one of the recording performance of the thin film magnetic head is secured, that is, the recording medium 50 can be magnetically overwritten with information if necessary. Therefore, in the embodiment, as described above, while information erasing without intention at the time of non-recording can be prevented, the overwrite characteristic can be secured.

Moreover, in the embodiment, the main pole layer 10 is formed so that the ratio W3/L3 satisfies the relationship of $W3/L3 \geqq 1.0$, so as described above, the rear end portion 10C constituting a large share of the main pole layer 10 has a horizontally long planar shape (a rectangular shape with a side in an X-axis direction longer than a side in a Y-axis direction). In this case, on the basis of the shape magnetic anisotropy of the rear end portion 10C constituting a large share of the main pole layer 10, the magnetic domain structure of the main pole layer 10 is determined. Therefore, in this point of view, the magnetic domain structure of the main pole layer 10 can be made appropriate so that the magnetization component 10X becomes dominant.

Further, in the embodiment, the main pole layer 10 is formed so that the ratio W2/W3 satisfies the relationship of $W2/W3 \geqq 0.7$, so as described above, the width of the main pole layer 10 is locally narrowed at the connecting position between the middle portion 10B and the rear end portion 10C. In this case, when the magnetic flux for recording flows from the rear end portion 10C to the middle portion 10B in the main pole layer 10, the magnetic flux is locally concentrated at the connecting point between the middle portion 10B and the rear end portion 10C, so the amount of the magnetic flux flowing from the rear end portion 10C to the middle portion 10B can be adjusted so that the magnetic flux saturation less easily occurs in the main pole layer 10, and the magnetic flux contained in the rear end portion 10C is less easily emitted directly from the air bearing surface 40 to outside not via the middle portion 10B. Therefore, as described above, when the ratio W2/W3 is made appropriate in addition to making the magnetic domain structure of the main pole layer 10 appropriate, information erasing without intention at the time of non-recording can be prevented.

In the embodiment, the main pole layer 10 is formed so that the summation L1+L2 satisfies the relationship of $0.5 \, \mu m \leqq (L1+L2) \leqq 5.0 \, \mu m$, so as described above, the rear end portion 10C is recessed 0.5 μm to 5.0 μm from the air bearing surface 40. In this case, the recessed position of the rear end portion 10C with a large magnetic volume is adjusted so that the magnetic flux contained in the rear end portion 10C is less easily emitted directly from the air bearing surface 30 to outside not via the middle portion 10B, and a necessary amount of the magnetic flux is supplied from the rear end portion 10C to the front end portion 10A via the middle portion 10B. Therefore, as described above, in addition to making the magnetic domain structure of the main pole layer 10 appropriate, when the ratio W2/W3 is made appropriate, information erasing without intention at the time of non-recording can be prevented. Moreover, as described above, in addition to forming the main pole layer 10 so as to include the front end portion 10A (with the width W1), the middle portion 10B (with the width W2) and the rear end portion 10C (with the width W3) in order from the air bearing surface 40 to the rear, when the summation L1+L2 is made appropriate, the overwrite characteristic can be secured.

In the embodiment, the width W1 of the top edge E1 (the trailing edge TE) of the exposed surface 10M of the main pole layer 10 is 0.2 µm or less, and the square measure S of the exposed surface 30M of the magnetic layer 30 is 7 µm$^2$ or more, so the magnetic volume (the volume to contain the magnetic flux) of the magnetic layer 30 is sufficiently large in proximity to the air bearing surface 40. In this case, the magnetic flux after recording is not easily focused on the magnetic layer 30, so it is difficult to generate an unnecessary magnetic field in the magnetic layer 30. The unnecessary magnetic field at this time is a magnetic field in a direction opposite to the direction of the perpendicular magnetic field, and by the unnecessary magnetic field, a recording pattern recorded on the recording medium 50 is erased, or the quality of the recording pattern is degraded. Therefore, information erasing without intention can be prevented. In this case, in particular, when the square measure S is 12.25 µm$^2$ or more, and more specifically 70 µm$^2$ or more, the quality of the recording pattern can be secured.

In this case, in particular, a relationship of $Y \geq \{7X/[9000 \times 10^3/(4\pi)]\} \times Z$ is established, where the saturated magnetic flux density of the magnetic layer 30 is X[T], the magnetic square measure of the exposed surface 30M is Y[µm$^2$T], and the maximum value of the strength of the perpendicular magnetic field which magnetizes the recording medium 50 is Z [×10$^3$/(4π)A/m], so when the magnetic square measure of the exposed surface 30M is set depending upon the maximum value of the strength of the perpendicular magnetic field, information erasing without intention can be prevented.

Figure 11:
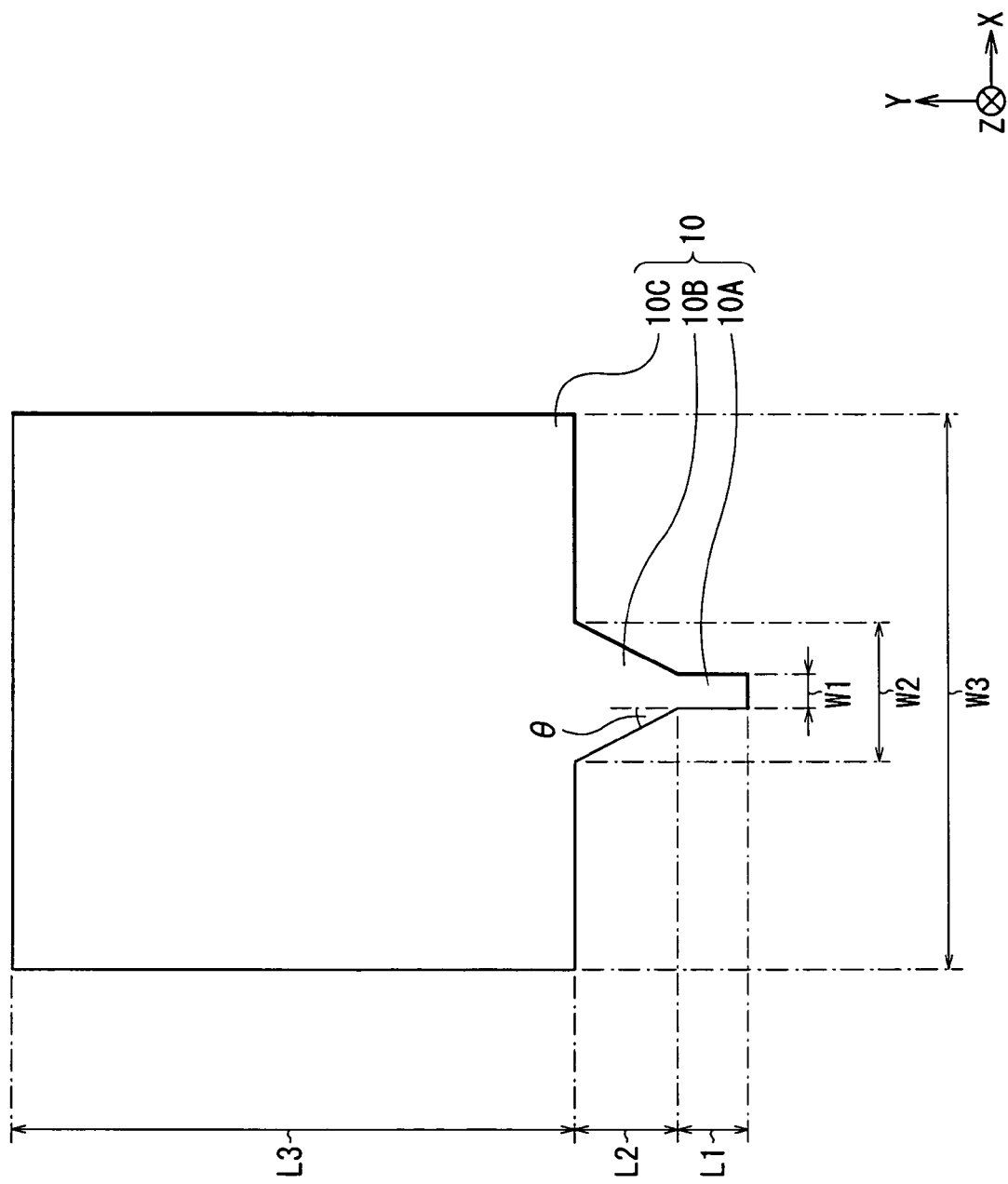
FIG. 11 is a plan view of a first modification of the thin film magnetic head according to the embodiment of the invention.

In the embodiment, as shown in FIG. 5, the main pole layer 10 is formed so as to include the front end portion 10A (with the width W1 and the length L1), the middle portion 10B (with the width W2 and the length L2) and the rear end portion 10C (with the width W3 and the length L3) in order from the air bearing surface 40 to the rear; however, each dimension of the main pole layer 10 (the widths W1, W2 and W3 and the lengths L1, L2 and L3) can be freely set as long as the above described dimensional relationships (W1<W2<W3, W3/(L1+L2+L3)≧1.0, W3/L3≧1.0, W2/W3≦0.7 and 0.5 µm≦(L1+L2)≦5.0 µm) are satisfied. As a specific example, in the above embodiment, as shown in FIG. 5, when the main pole layer 10 is formed so that the ratio W3/L3 satisfies the relationship of W3/L3>1.0, the rear end portion 10C has a horizontally long planar shape (a rectangular shape with a side in an X-axis direction longer than a side in a Y-axis direction); however, the embodiment is not specifically limited to the case. For example, as shown in FIG. 11, the rear end portion 10C may have a square planar shape through forming the main pole layer 10 so that the ratio W3/L3 satisfies a relationship of W3/L3=1.0. Also in this case, substantially the same effects as those in the embodiment can be obtained. The characteristics of the main pole layer 10 shown in FIG. 11 are the same as those shown in FIG. 5, except for the above described characteristic.

Figure 12:
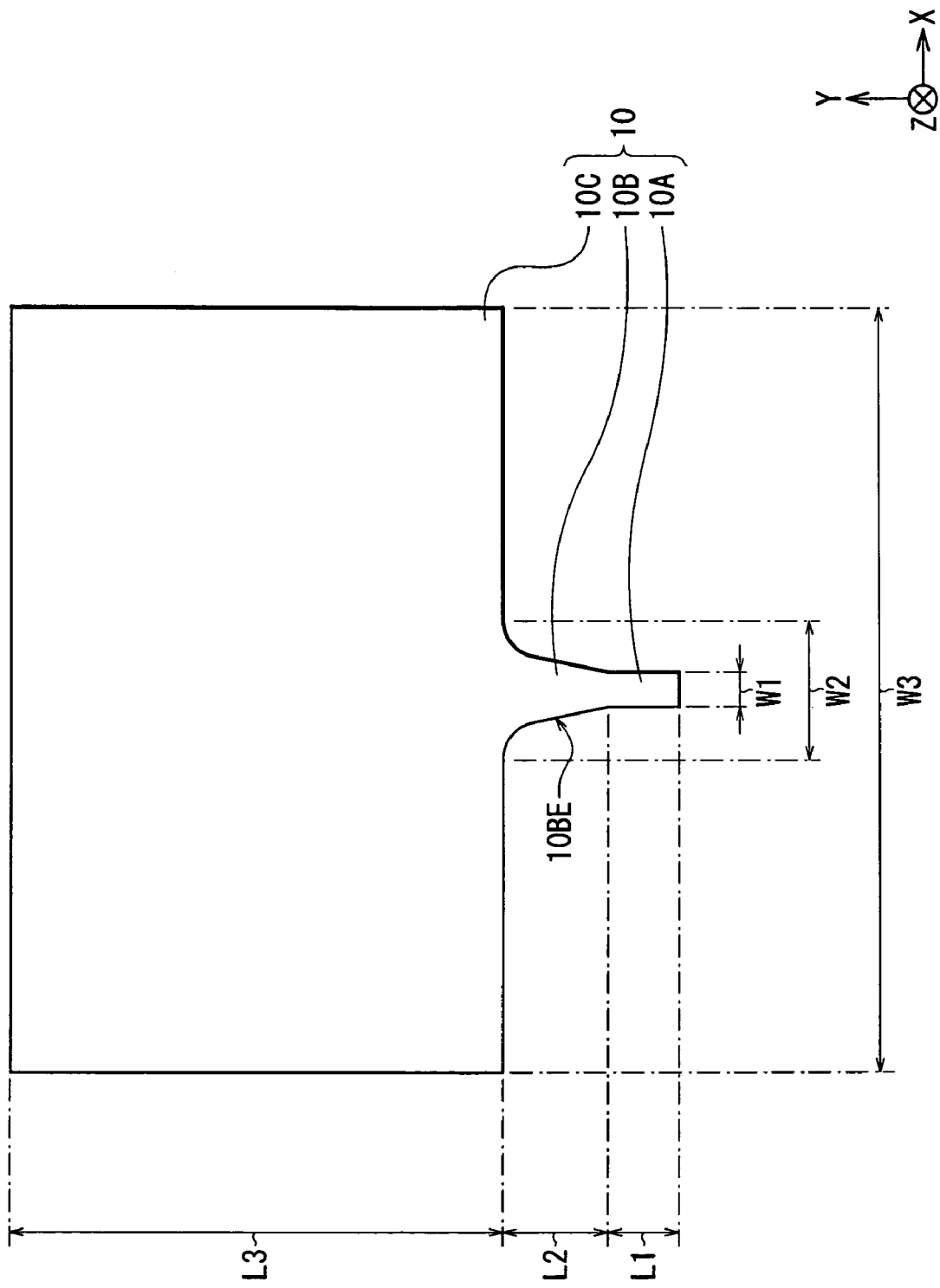
FIG. 12 is a plan view of a second modification of the thin film magnetic head according to the embodiment of the invention.

In the embodiment, as shown in FIG. 5, the main pole layer 10 is formed so that two side edges 10BE of the middle portion 10B linearly extend; however, the embodiment is not necessarily limited to the case. For example, as shown in FIG. 12, the main pole layer 10 may be formed so that two side edges 10BE of the middle portion 10B extend in a curved line. Also in this case, substantially the same effects as those in the above embodiment can be obtained. The characteristics of the main pole layer 10 shown in FIG. 12 are the same as those of the main pole layer 10 shown in FIG. 5 except for the above-described characteristic.

Figure 13:
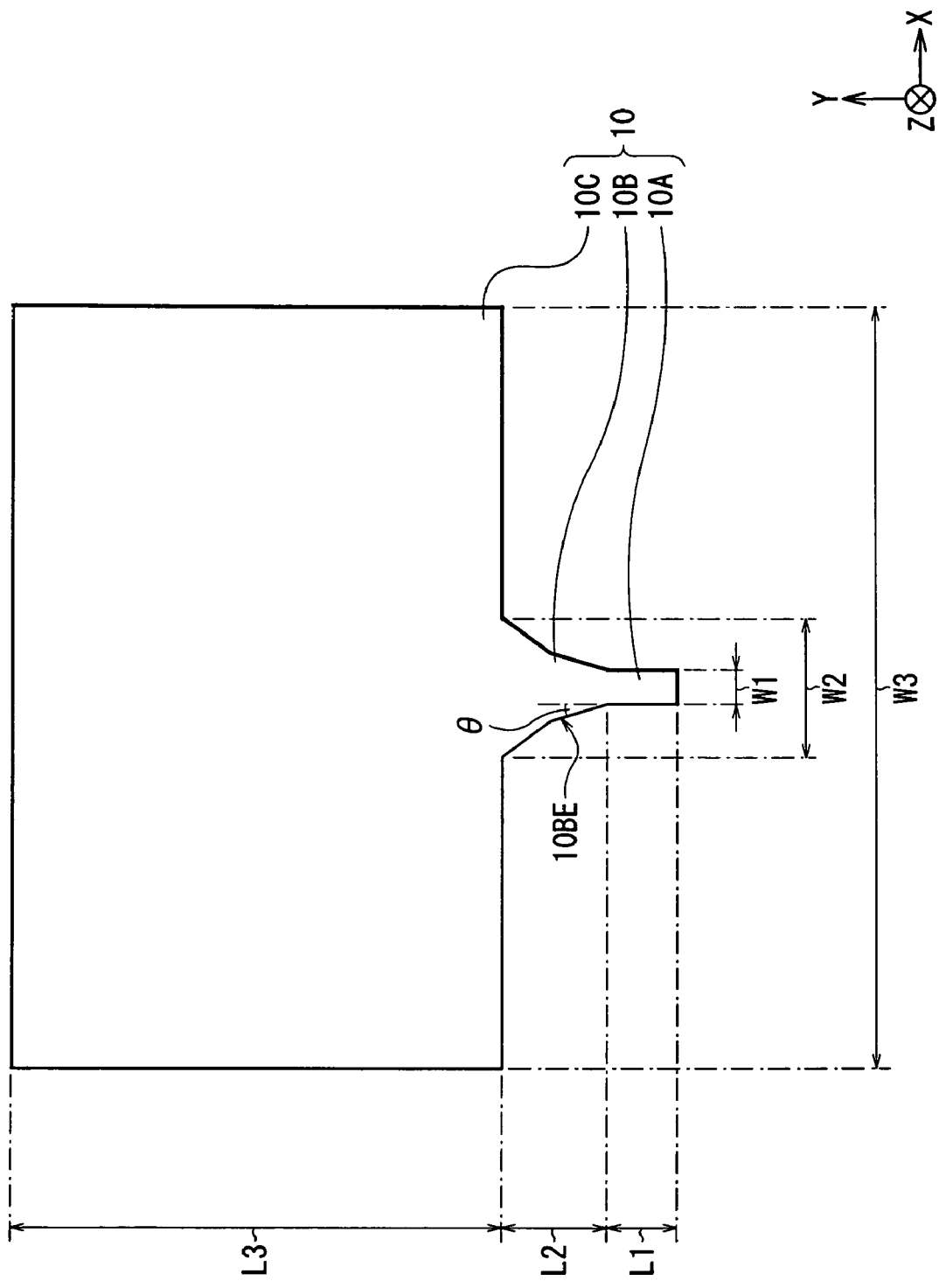
FIG. 13 is a plan view of a third modification of the thin film magnetic head according to the embodiment of the invention.

In the embodiment, as shown in FIG. 5, the main pole layer 10 is formed so that two side edges 10BE of the middle portion 10B linearly extend as a whole, that is, the width of the middle portion 10B continuously expand as two edges 10BE are gradually separated from each other; however, the embodiment is not necessarily limited to this case. For example, the main pole layer 10 may be formed so that two side edges 10BE of the middle portion 10B linearly extend so as to be bended in stages, that is, the width of the middle portion 10B discontinuously expands according to bends of two side edges in stages. More specifically, for example, as shown in FIG. 13, the main pole layer 10 may be formed so that each of two side edges 10BE is bended at one point, that is, the width of the middle portion 10B expands on the basis of bended points of two side edges. Also in this case, substantially the same effects as those in the above embodiment can be obtained. As a reminder, the number of bended points in each of two side edges 10BE is not necessarily one as shown in FIG. 13, and may be two or more. The characteristics of the main pole layer 10 shown in FIG. 13 are the same as those of the main pole layer 10 shown in FIG. 5 except for the above-described characteristic.

Figure 14:
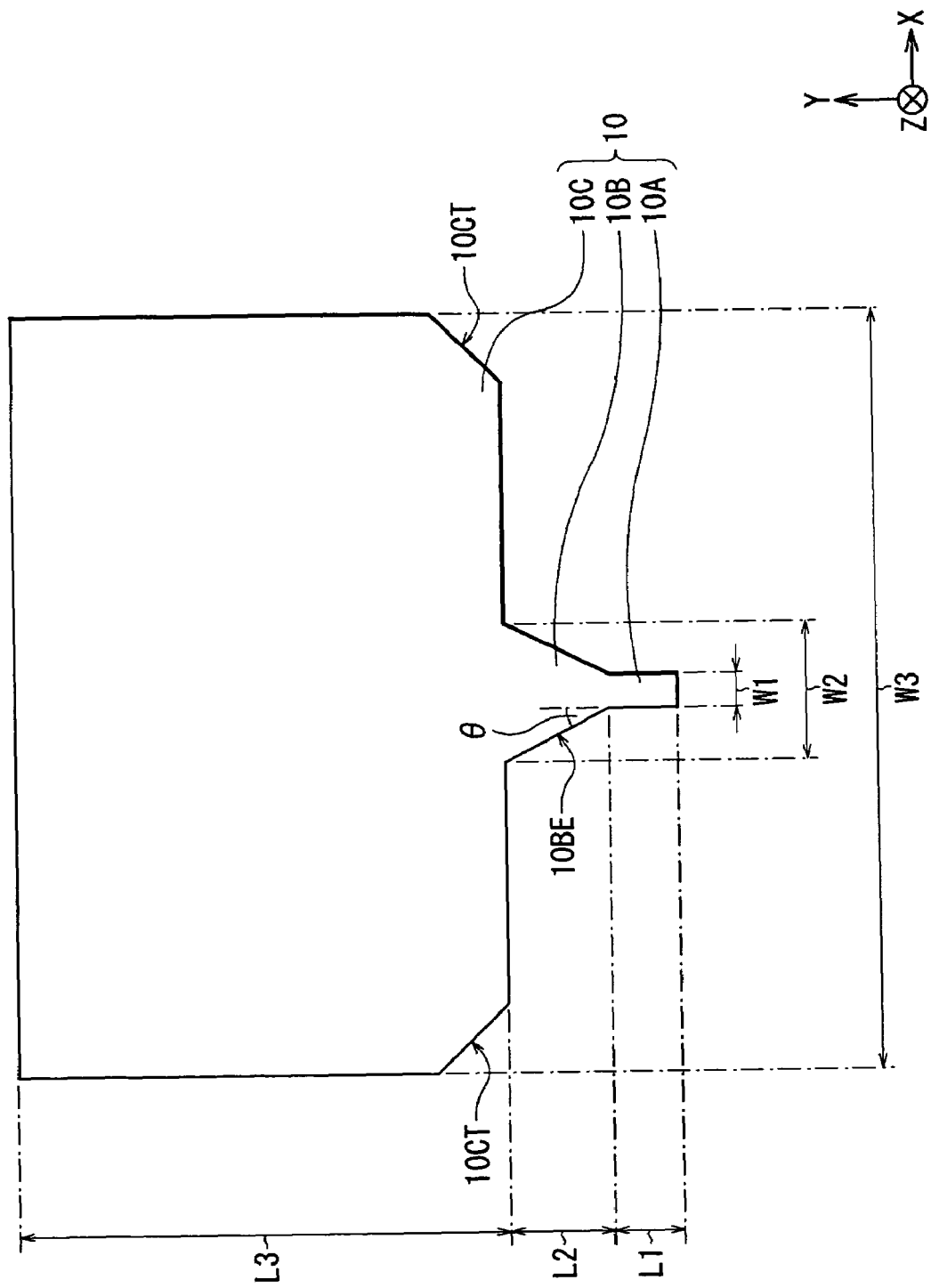
FIG. 14 is a plan view of a fourth modification of the thin film magnetic head according to the embodiment of the invention.
Figure 15:
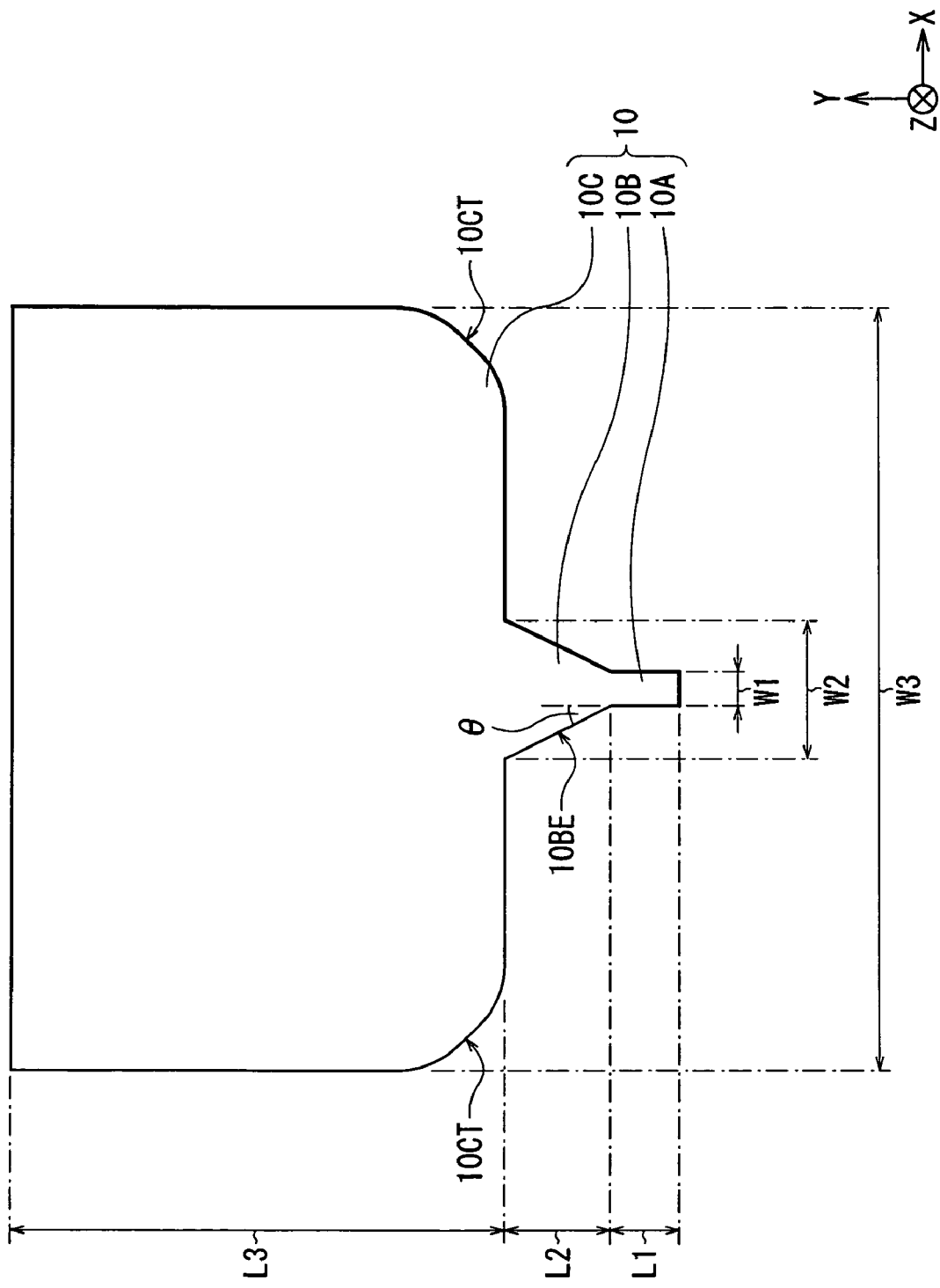
FIG. 15 is a plan view of a fifth modification of the thin film magnetic head according to the embodiment of the invention.

In the embodiment, as shown in FIG. 5, the main pole layer 10 is formed so as to have a corner portion 10CK in each front side of the rear end portion 10C; however, the embodiment is not necessarily limited to this case. For example, as shown in FIGS. 14 and 15, the main pole layer 10 may be formed so as to have a taper portion 10CT in each front side of the rear end portion 10C. In this case, as shown in FIG. 14, the taper portion 10CT may have a flat surface, or as shown in FIG. 15, the taper portion 10CT may have a rounded surface. In the case where the rear end portion 10C has the taper portion 10CT, compared to the case where the rear end portion 10C has the corner portion 10CK, the magnetic flux contained in the rear end portion 10C can be more effectively prevented from being emitted directly from the air bearing surface 40 to outside not via the middle portion 10B, so information erasing without intention at the time of non-recording can be prevented. It is because in the case where the rear end portion 10C has the corner portion 10CK, the magnetic flux contained in the rear end portion 10C is easily focused on the corner portion 10CK, so the magnetic flux focused on the corner portion 10CK is easily emitted directly from the air bearing surface 40 to the outside; however, in the case where the rear end portion 10C has the taper portion 10CT (the rear end portion 10C does not have the corner portion 10CK), the phenomenon that the magnetic flux contained in the rear end portion 10C is focused on the corner portion 10CK can be avoided, so the magnetic flux contained in the rear end portion 10C is less easily emitted directly from the air bearing surface 40 to the outside. The characteristics of the main pole layer 10 shown in FIGS. 14 and 15 are the same as those of the main pole layer 10 shown in FIG. 5 except for the above-described characteristic.

This is the end of the descriptions about the perpendicular magnetic recording head according to the embodiment of the invention.

Figure 16:
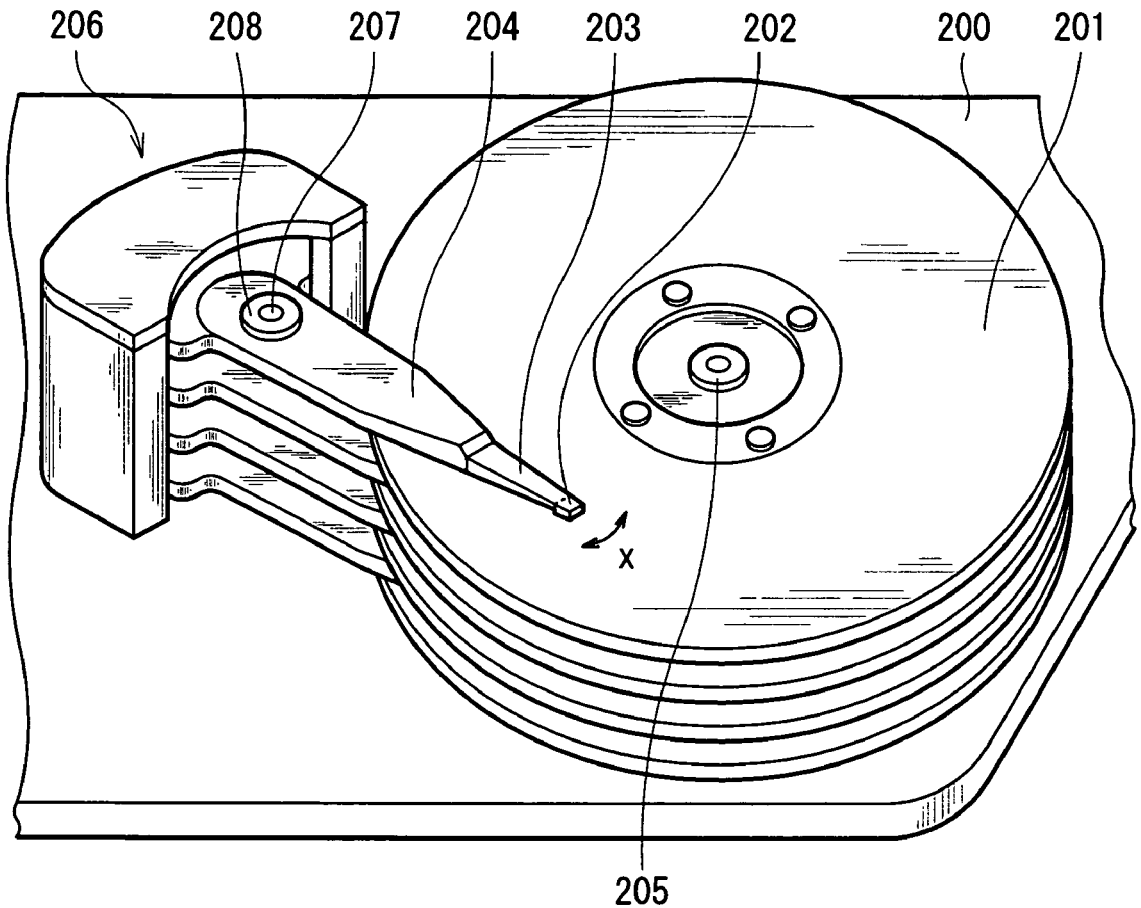
FIG. 16 is a perspective view of a magnetic recording apparatus including the thin film magnetic head according to the embodiment of the invention.
Figure 17:
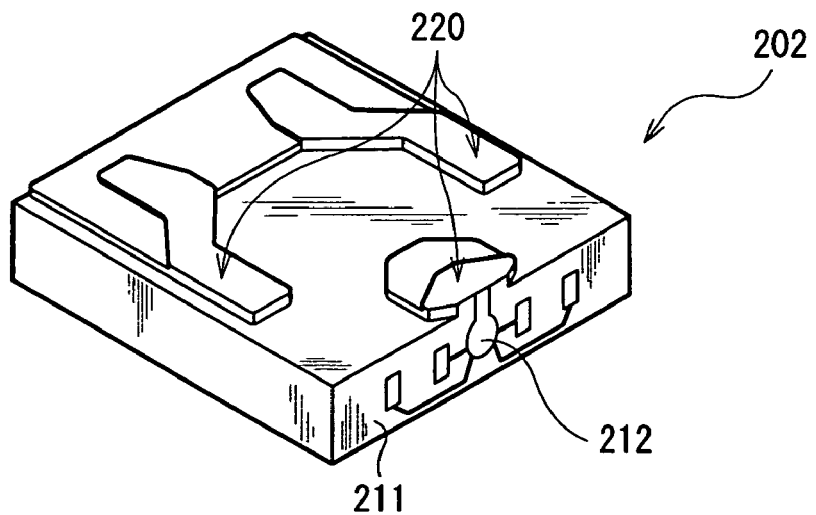
FIG. 17 is an enlarged perspective view of a main part of the magnetic recording apparatus shown in FIG. 16.

Next, referring to FIGS. 16 and 17, the structure of a magnetic recording apparatus including the perpendicular magnetic recording head according to the embodiment of the invention will be described below. FIG. 16 shows a perspective view of the magnetic recording apparatus, and the FIG. 17 shows an enlarged perspective view of a main part of the magnetic recording apparatus. The magnetic recording apparatus includes the thin film magnetic head described in the above embodiment (refer to FIGS. 1A and 1B through 5), and the magnetic recording apparatus is, for example, a hard disk drive.

For example, as shown in FIG. 16, the magnetic recording apparatus includes a plurality of magnetic disks (for example, hard disks) 201 as recording media 50 (refer to FIG. 4) on which information is magnetically recorded, a plurality of suspensions 203 each of which is disposed so as to correspond to each magnetic disk 201 and supports a magnetic head slider 202 in an end portion, and a plurality of arms 204 each of which supports the other end of each suspension 203 in an enclosure 200. The magnetic disks 201 are rotatable about a spindle motor 205 fixed on the enclosure 200 as a center. The arms 204 are connected to a driving portion 206 as a power source, and are pivotable about a fixed shaft 207 fixed on the enclosure 200 as a center through a bearing 208. The driving portion 206 includes, for example, a driving source such as a voice coil motor. The magnetic recording apparatus is a model in which the plurality of arms 204 integrally pivot about the fixed shaft 207 as a center. In order to easily show an internal structure of the magnetic recording apparatus, in FIG. 16, the enclosure 200 is partially cut away.

As shown in FIG. 17, the magnetic head slider 202 has a structure in which a thin film magnetic head 212 performing a recording process and a reproducing process is disposed on a surface of a substantially-rectangular-shaped substrate 211 made of, for example, a non-magnetic insulating material such as AlTiC. The substrate 211 has an uneven surface (an air bearing surface 220) so as to reduce air resistance generated when the arms 202 pivot, and the thin film magnetic head 212 is disposed on another surface of the substrate 211 (in FIG. 17, a surface on a right front side) orthogonal to the air bearing surface 220. The thin film magnetic head 212 has, for example, the structure described in the above embodiment. When the magnetic disk 201 rotates at the time of recording or reproducing information, an air flow occurs between a recording surface of the magnetic disk 201 (a surface facing the magnetic head slider 202) and the air bearing surface 220, and the magnetic head slider 202 is floated from the recording surface of the magnetic disk 201 by the airflow. In order to easily show a structure of the head slider 202 on a side closer to the air bearing surface 220, FIG. 17 shows the magnetic head slider 202 turned upside down from a state of FIG. 16.

In the magnetic recording apparatus, the arm 204 pivots at the time of recording or reproducing information so that the magnetic head slider 202 moves to a predetermined region (recording region) of the magnetic disk 201. Then, when the thin film magnetic head 212 is energized in a state of facing the magnetic disk 201, the thin film magnetic head 212 is operated on the basis of the principle of operation described in the above embodiment so as to perform a recording process or a reproducing process on the magnetic disk 201.

In the magnetic recording apparatus, as the thin film magnetic head 212 described in the above embodiment is included, the magnetic domain structure of the main pole layer 10 is made appropriate so that an unnecessary magnetic flux is not easily leaked in the thin film magnetic head 212 at the time of non-recording. Therefore, as the magnetic recording apparatus includes the thin film magnetic head 212 in which the magnetic domain structure of the main pole layer 10 is made appropriate, information erasing without intention at the time of non-recording can be prevented.

Structures, actions, functions, effects and modifications of the thin film magnetic head 212 included in the magnetic recording apparatus are equivalent to those in the embodiment, so they will not be further described.

EXAMPLES

Next, examples of the invention will be described below.

When the recording performance of the thin film magnetic head described in the above embodiment (refer to FIGS. 1A and 1B through 5), that is, the thin film magnetic head including the main pole layer with the structural characteristics shown in FIG. 5 was examined through including the thin film magnetic head in the magnetic recording apparatus (refer to FIGS. 16 and 17), and performing a recording process through the use of the magnetic recording apparatus, the following results were obtained.

Figure 18:
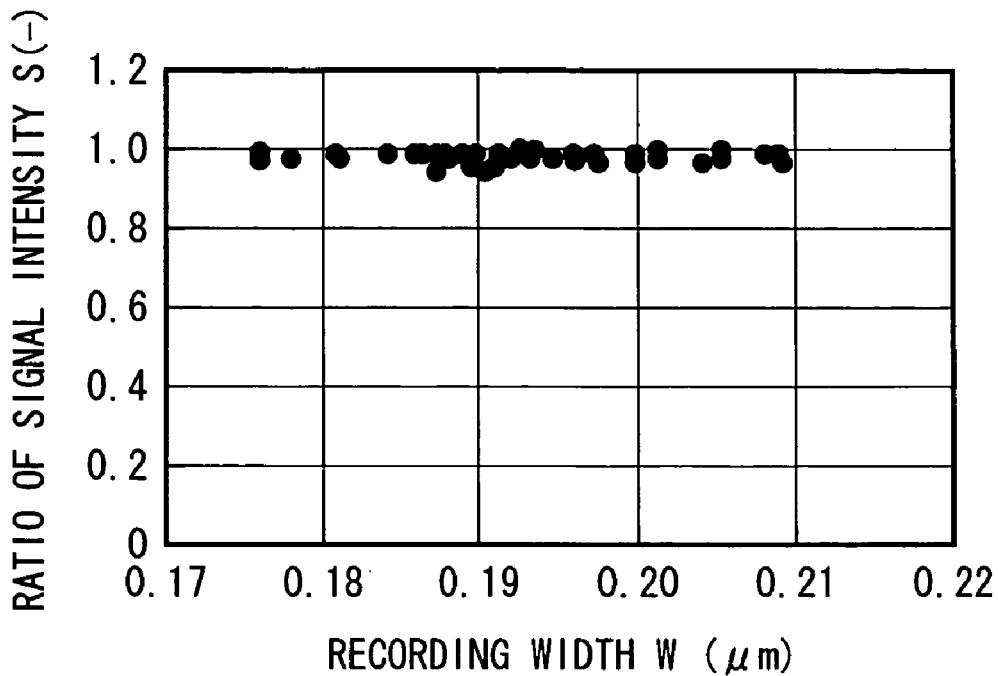
FIG. 18 is a plot showing the dependence of the degradation state of a recording signal on a recording width in the thin film magnetic head according to the embodiment of the invention.

At first, when the degradation state of a recording signal in the thin film magnetic head according to the embodiment of the invention was examined, results shown in FIG. 18 were obtained. FIG. 18 shows the dependence of the degradation state of the recording signal on a recording width, and the horizontal axis indicates a recording width W (µm), that is, the recording track width on the recording medium, and the vertical axis indicates a ratio of signal intensity S (-). In order to examine the degradation state of the recording signal, a current flew through the thin film coil to perform a normal recoding process on the recording medium through the use of the thin film magnetic head, and then in the state where no current flew through the thin film coil, after the recording medium was traced through the use of the thin film magnetic head as in the case of normal recording, a normal reproducing process was performed through the use of the thin film magnetic head. At that time, the intensity S1 of the recording signal before tracing and the intensity S2 of the reproducing signal after tracing were examined to determine the ratio of signal intensity S (=S2/S1) on the basis of the intensities S1 and S2 by calculation. In other words, the ratio of signal intensity S is an indicator of attenuation of the recording signal before and after tracing, that is, an indicator of the susceptibility to information erasing without intention at the time of non-recording. The measurement data number N of data shown in FIG. 18 was 40.

Figure 19:
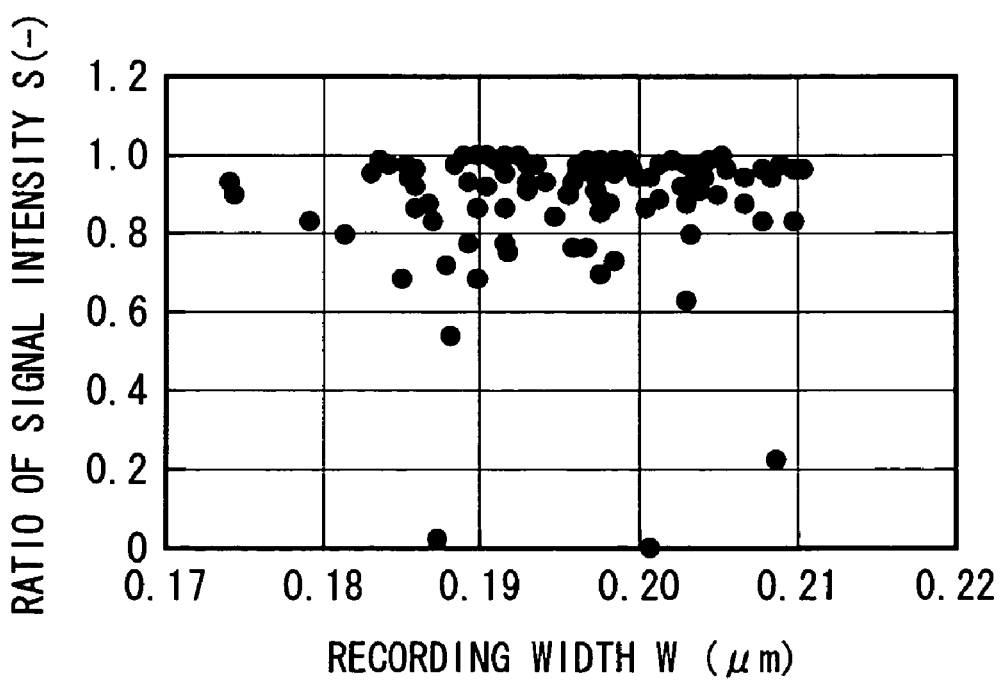
FIG. 19 is a plot showing the dependence of the degradation state of a recording signal on a recording width in the thin film magnetic head of the comparative example.

When the degradation state of the recording signal in the thin film magnetic head according to the embodiment of the invention was examined, in order to make a comparative evaluation of the degradation state of the recording signal, the degradation state of a recording signal in the thin film magnetic head of the comparative example including the main pole layer with the structural characteristics shown in FIG. 6 was examined at the same time. The results are shown in FIG. 19. The measurement data number N of data shown in FIG. 19 was 50.

It was obvious from the results shown in FIG. 19 that in the thin film magnetic head of the comparative example, according to a change in the recording width W, the ratio of signal intensity S was distributed over a wide range, and more specifically, the ratio of signal intensity S was widely distributed over a range of approximately 0.03 to 1.0. The results showed that as the magnetic domain structure was not made appropriate by the shape magnetic anisotropy of the main pole layer, information was easily erased without intention at the time of non-recording. On the other hand, it was obvious from the results shown in FIG. 18 that in the thin film magnetic head according to the embodiment of the invention, according to a change in the recording width W, the ratio of signal intensity S was distributed over a narrow range, and more specifically, the ratio of signal intensity S was distributed over a range of approximately 0.94 to 1.0. In particular, In the case of the lower limit of an acceptable ratio of signal intensity S in the product level of the thin film magnetic head was 0.85, in the thin film magnetic head according to the embodiment of the invention, all of the degradation states of the recording signal were within an acceptable range. The results showed that as the magnetic domain structure was made appropriate on the basis of the shape magnetic anisotropy of the main pole layer, information was not easily erased without intention at the time of non-recording. Therefore, in the thin film magnetic head according to the embodiment of the invention, it was confirmed that when the magnetic domain structure of the main pole layer was made appropriate, information erasing without intention at the time of non-recording could be prevented.

Figure 20:
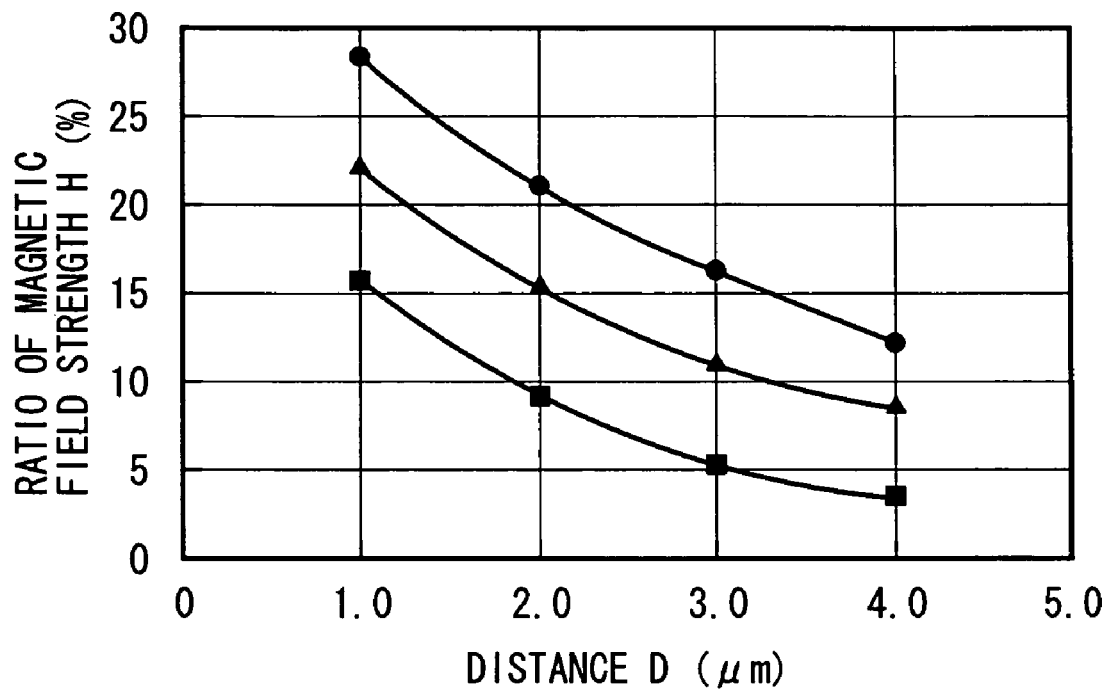
FIG. 20 is a plot showing the position dependence of a magnetic field strength distribution (a track to be recorded and another track) on the recording medium on the recording medium.
Figure 21:
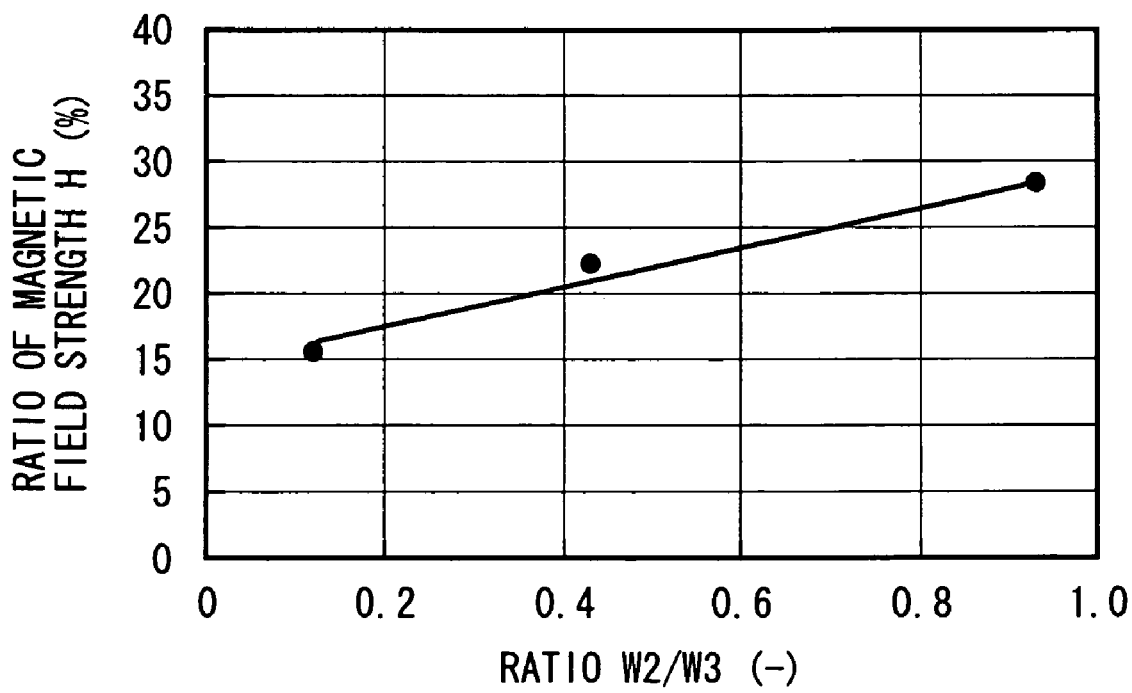
FIG. 21 is a plot showing the shape dependence of a main pole layer relating to a magnetic field strength distribution (a track to be recorded and another track) on the recording medium.

Next, when the state of information erasing without intention in the thin film magnetic head according to the embodiment of the invention was examined, the results shown in FIGS. 20 and 21 were obtained.

FIG. 20 shows the position dependence of a magnetic field strength distribution on the recording medium, and the horizontal axis indicates distance D (μm), and the vertical axis indicates the ratio of magnetic field strength H (%). The "distance D" is a distance for determining a position in a direction (a cross track direction) crossing a predetermined track which is subjected to a recording process through the use of thin film magnetic head among a plurality of tracks disposed on the recording medium in the case where the track to be recorded is a reference (the distance D=0 μm). When the position dependence of the magnetic field strength distribution on the recording medium was examined, while a recoding process was performed on the track to be recorded on the recording medium through the use of the thin film magnetic head, the magnetic field strength (the strength of a recording magnetic field) H1 in the track to be recoded (a track center position) and the magnetic field strength (the strength of an unnecessary magnetic field) H2 in a position specified by the distance D were examined to determine the ratio of magnetic field strength H (=[S2/S1]×100) by calculation on the basis of the magnetic field strengths S1 and S2. At that time, as the dimension of each part of the main pole layer, the summation L1+L2 was 2.5 μm, and the width W3 was 20.0 μm, and the ratio W2/W3 was changed in three stages, that is, to 0.93, 0.43 and 0.12. In other words, the ratio of magnetic field strength H is an indicator of the susceptibility to information erasing without intention in another track disposed in parallel with the track to be recorded on the recording medium. In addition, "●" shown in FIG. 20 indicates a result in the case of W2/W3=0.93, "▲" indicates a result in the case of W2/W3=0.43, and "■" indicates a result in the case of W2/W3=0.12.

FIG. 21 shows the shape dependence of the main pole layer relating to the magnetic field strength distribution on the recording medium, and the horizontal axis indicates the ratio W2/W3 (-), and the vertical axis indicates the ratio of magnetic field strength H (%). The "ratio of magnetic field strength H" indicates a ratio (H=[S2/S1]×100) between the magnetic field strength (the strength of a recording magnetic field) H1 on the track to be recorded (the track center position) and the magnetic field strength (the strength of an unnecessary magnetic field) H2 on another track (an adjacent track) adjacent to the track to be recorded.

It was obvious from the results shown in FIG. 20 that when the ratio W2/W3 was changed in three stages, in each case, the ratio of magnetic field strength S was gradually reduced with distance from the track to be recorded in a cross track direction. In this case, in particular, the ratio of magnetic field strength S was gradually reduced with a decrease in the ratio W2/W3, that is, the ratio of magnetic field strength S was reduced in order of the ratio W2/W3=0.93, 0.43 and 0.12. The results showed that the smaller the ratio W2/W3 was, the more the strength of the unnecessary magnetic field in a position away from the track to be recorded was reduced, so information erasing without intention due to the unnecessary magnetic field could be prevented. Therefore, it was confirmed that in the thin film magnetic head according to the embodiment of the invention, the extent to which information was erased without intention due to the unnecessary magnetic field was dependent on the ratio W2/W3.

Moreover, it was obvious from the results shown in FIG. 21 that the ratio of magnetic field strength H was gradually reduced with a decrease in the ratio W2/W3. The results showed that the smaller the ratio W2/W3 was, the less easily the magnetic flux contained in the rear end portion of the main pole layer was emitted directly from the air bearing surface to outside, so information erasing without intention due to the unnecessary magnetic field could be prevented. In this case, in particular, in the case where an acceptable ratio of magnetic field strength H in the product level of the thin film magnetic head was 25% or less, and preferably 20% or less, when the ratio W2/W3 was 0.7% or less, and preferably 0.37% or less, the ratio of magnetic field strength H fell in an acceptable range. Therefore, it was confirmed that in the thin film magnetic head according to the embodiment of the invention, when the main pole layer was formed so that the ratio W2/W3 satisfied a relationship of W2/W3≦0.7, preferably W2/W3≦0.37, information erasing without intention could be prevented.

Figure 22:
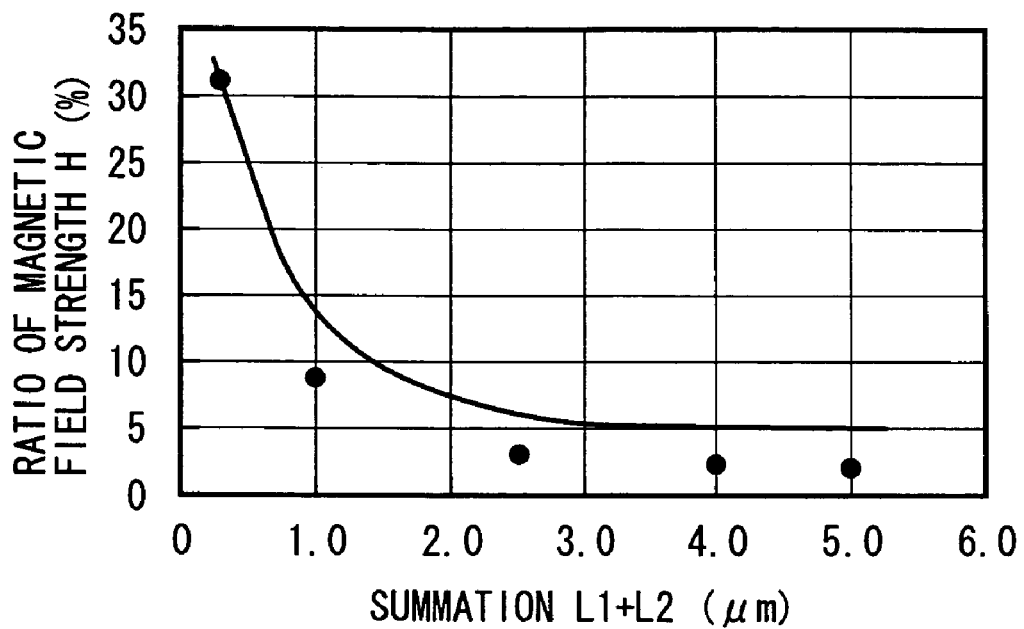
FIG. 22 is a plot showing the shape dependence of a main pole layer relating to a magnetic field strength distribution (a track to be recorded and an adjacent track) on the recording medium.
Figure 23:
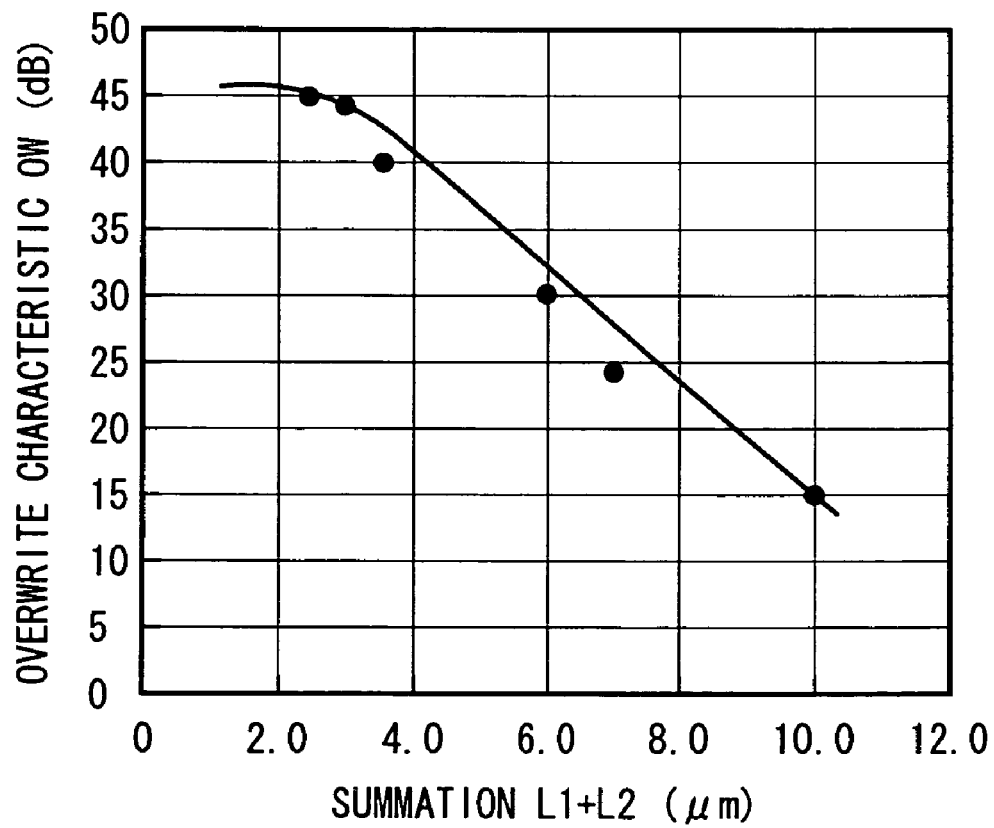
FIG. 23 is a plot showing the shape dependence of a main pole layer relating to an overwrite characteristic.

Next, when another state of information erasing without intention in the thin film magnetic head according to the embodiment of the invention was examined, results shown in FIGS. 22 and 23 were obtained.

FIG. 22 shows the shape dependence of the main pole layer relating to a magnetic field strength distribution on the recording medium, and the horizontal axis indicates the summation L1+L2 (μm), and the vertical axis indicates the ratio of magnetic field strength H (%). In order to examine the shape dependence of the main pole layer relating to the magnetic field distribution on the recording medium, while changing the summation L1+L2 in the main pole layer, the magnetic field strength (the strength of the recording magnetic field) H1 on the track to be recorded (in the track center position) on the recording medium and the magnetic field strength (the strength of then unnecessary magnetic field) H2 on the adjacent track were examined to determine the ratio of magnetic field strength H (=[S2/S1]×100) on the basis of the magnetic field strengths S1 and S2 by calculation.

FIG. 23 shows the shape dependence of the main pole layer relating to an overwrite characteristic, and the horizontal axis indicates the summation L1+L2 (μm), and the vertical axis indicates an overwrite characteristic OW (dB).

It was obvious from the results shown in FIG. 22 that the ratio of magnetic field strength H was gradually reduced with an increase in the summation L1+L2. More specifically, the ratio of magnetic field strength H was sharply reduced with an increase in the summation L1+L2, and then the ratio of magnetic field strength H became constant within a range of the summation L1+L2=3.0 μm or more. The results showed that the larger the summation L1+L2 was, the more the rear end portion was recessed from the air bearing surface, that is, the less easily the magnetic flux contained in the rear end portion was emitted directly from the air bearing surface to outside, so information erasing without intention due to the unnecessary magnetic field could be prevented. In this case, in the case where an acceptable ratio of magnetic field strength H in the product level of the thin film magnetic head was 25% or less, and preferably 20% or less, when the summation L1+L2 was 0.5 or more, preferably 0.7 or more, the ratio of magnetic field strength H fell in an acceptable range. Therefore, it was confirmed that in the thin film magnetic head according to the embodiment of the invention, when the main pole layer was formed so that the summation L1+L2 satisfied a relationship of (L1+L2)≧0.5, preferably (L1+L2)≧0.7, information erasing without intention could be prevented.

Moreover, it was obvious from the results shown in FIG. 23 that the overwrite characteristic OW was gradually increased with a decrease in the summation L1+L2. The results showed that the smaller the summation L1+L2 was, the closer the rear end portion was positioned to the air bearing surface, that is, the more easily a sufficient amount of magnetic flux contained in the rear end portion was guided to the front end portion via the middle portion, so the recording medium was easily and properly overwritten on the basis of the sufficient amount of magnetic flux guided to the front end portion. In this case, in the case where an acceptable overwrite characteristic OW in the product level of the thin film magnetic head was 35 dB or more, and preferably 40 dB or more, when the summation L1+L2 was 5.0 µm or less, and preferably 4.0 µm less, the overwrite characteristic fell in an acceptable range. Therefore, it was confirmed that in the thin film magnetic head according to the embodiment of the invention, when the main pole layer was formed so that the summation L1+L2 satisfied a relationship of (L1+L2)≦5.0 µm, preferably (L1+L2)≦4.0 µm, the overwrite characteristic could be secured.

The relationship of values determined by the results shown in FIGS. 22 and 23 was summarized that in the thin film magnetic head according to the embodiment of the invention, when the main pole layer was formed so that the summation L1+L2 satisfied a relationship of 0.5 µm≦(L1+L2)≦5.0 µm, preferably 0.7 µm≦(L1+L2)≦4.0 µm, information erasing without intention could be prevented, and the overwrite characteristic could be secured.

Next, when a relationship between the structure of the magnetic layer and information erasing without intention was examined, the following results were obtained.

Figure 24:
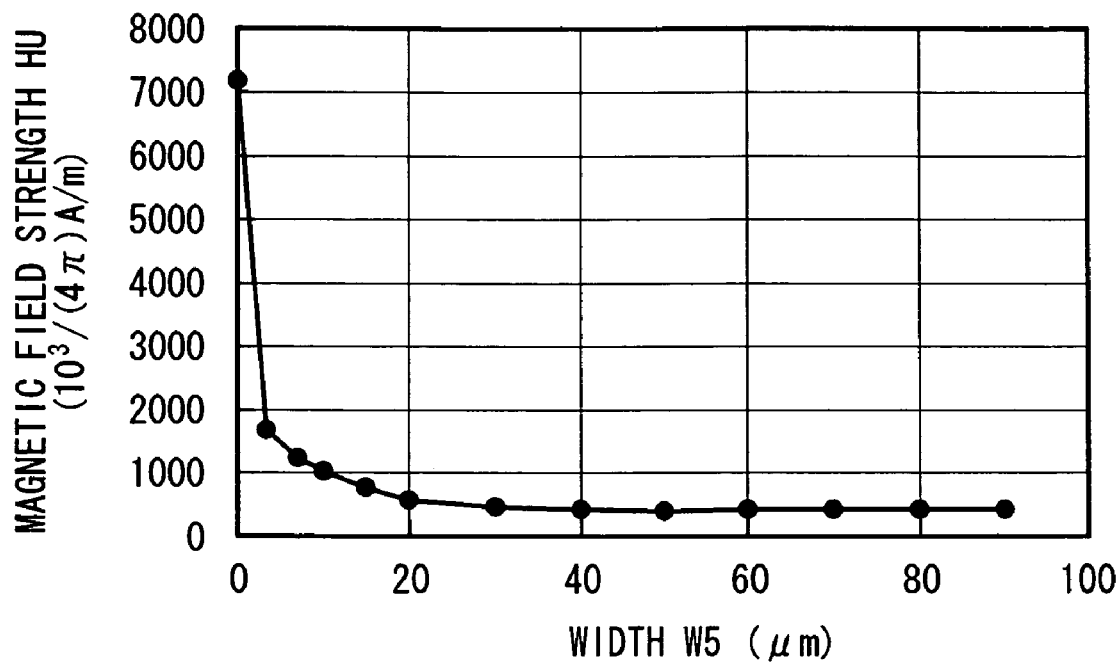
FIG. 24 is a plot showing a correlation between the strength of an unnecessary magnetic field and the width of an exposed surface of a magnetic layer.
Figure 25:
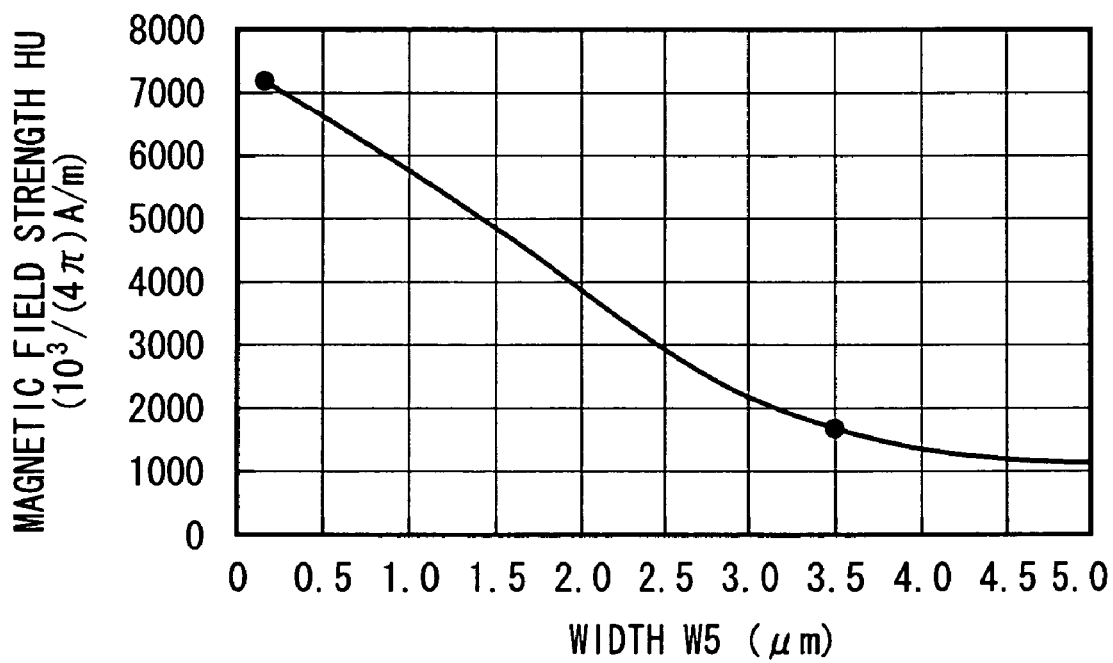
FIG. 25 is an enlarged plot showing a part of the correlation between the strength of the unnecessary magnetic field and the width of the exposed surface of the magnetic layer shown in FIG. 24.

At first, when the influence of the width of the exposed surface of the magnetic layer exerted on information erasing without intention was examined, the results shown in FIGS. 24 and 25 were obtained. FIGS. 24 and 25 show a correlation between the strength of an unnecessary magnetic field and the width of the exposed surface of the magnetic layer, and the horizontal axis indicates the width W5 of the exposed surface of the magnetic layer (µm), and the vertical axis indicates the strength of an unnecessary magnetic field (the magnetic field strength HU; $10^3/(4\pi)$A/m). The correlation shown in FIG. 25 shows an enlarged plot of a part of the correlation shown in FIG. 24 (in a range of the width W5=0 µm to 5.0 µm). When the influence of the width of the exposed surface of the magnetic layer exerted on information erasing without intention was examined, as dimensions of the thin film magnetic head, the width W1 of the top edge (the trailing edge) in the exposed surface of the main pole layer was 0.2 µm, the width W5 of the exposed surface of the magnetic layer was 0.2 µm to 90 µm, the height H of the exposed surface of the magnetic layer was 3.5 µm, and the coercivity Hc of the recording medium was $4000 \times 10^3/(4\pi)$A/m.

It was obvious from the results shown in FIG. 24 that as the width W5 increased, the magnetic field strength HU was sharply reduced, and then became substantially constant. More specifically, the magnetic field strength HU was at its maximum ($7139 \times 10^3/(4\pi)$A/m) at the width W5=0.2 µm, and within a range of the width W5=20 µm or more, the magnetic field strength HU was substantially constant ($372 \times 10^3/(4\pi)$A/m to $550 \times 10^3/(4\pi)$A/m). The results showed that as the larger the width W5 was, the more the magnetic volume of the magnetic layer in proximity to the air bearing surface increased, so the magnetic flux after recording was not easily focused on the magnetic layer.

On the basis of the changing trend of the magnetic field strength HU shown in FIG. 24, an appropriate range of the width W5 in which information erasing without intention due to a phenomenon that the magnetic flux after recording was focused on the magnetic layer could be prevented was estimated through the use of the results shown in FIG. 25. More specifically, the coercivity Hc of the recording medium was $4000 \times 10^3/(4\pi)$A/m, so in order to prevent information erasing without intention in the recording medium, when the range of the width W5 in which the magnetic field strength HU was smaller than $4000 \times 10^3/(4\pi)$A/m was determined, the range of the width W5 was 2.0 µm or more. In this case, in particular, the rate of decrease in the magnetic field strength HU was largely decreased within a range of the width W5=3.5 µm or more, and the magnetic field strength HU was substantially constant within a range of the width W5=20 µm or more.

Next, when the influence of the width and the thickness of the exposed surface of the magnetic layer exerted on information erasing without intention was examined, the results shown in Tables 1 and 2 were obtained. Table 1 shows a correlation between the strength of an unnecessary magnetic field (the magnetic field strength HU) and the width (width W5) of the exposed surface of the magnetic layer, and Table 2 shows the strength of the unnecessary magnetic field (magnetic field strength HU) and the height (height H5) of the exposed surface of the magnetic layer. When the influence of the width of the exposed surface of the magnetic layer exerted on information erasing without intention was examined, as the dimensions of the thin film magnetic head, the width W5 of the exposed surface of the magnetic layer was 90 µm or 45 µm, and the height H5 of the exposed surface of the magnetic layer was 3.5 µm. Moreover, when the influence of the height of the exposed surface of the magnetic layer exerted on information erasing without intention was examined, as the dimensions of the thin film magnetic head, the height H5 of the exposed surface of the magnetic layer was 3.5 µm or 1.75 µm, and the width W5 of the exposed surface of the magnetic layer was 90 µm. Conditions except for the above conditions were the same as those in the case shown in FIGS. 24 and 25. The magnetic field strength HU (refer to Table 1) in the case of the width W3=90 µm and the magnetic field strength HU (refer to table 2) in the case of the height H=3.5 µm were $372 \times 10^3/(4\pi)$A/m.

TABLE 1

| WIDTH W5 (µm) | MAGNETIC FIELD STRENGTH HU ($10^3/(4\pi)$A/m) |
|---|---|
| 90 | 372 |
| 45 | 416 |

TABLE 2

| HEIGHT H5 (µm) | MAGNETIC FIELD STRENGTH HU ($10^3/(4\pi)$A/m) |
|---|---|
| 3.5 | 372 |
| 1.75 | 463 |

It was obvious from the results shown in Table 1 that when the width W5 was reduced to half, the magnetic field strength HU increased. More specifically, when the width W5 was changed from 90 µm to 45 µm, the magnetic field strength HU was changed from $372\times10^3/(4\pi)$A/m to $416\times10^3/(4\pi)$A/m. On the other hand, it was obvious from the results shown in Table 2 that when the height H5 was reduced to half, the magnetic field strength HU increased. More specifically, when the height H5 was changed from 3.5 μm to 1.75 μm, the magnetic field strength HU was changed from $372\times10^3/(4\pi)$A/m to $463\times10^3/(4\pi)$A/m. Therefore, in the case where either the width W5 or the height H5 was changed, the magnetic field strength HU was substantially the same value, so it was confirmed that the magnetic field strength HU was dependent upon the square measure of the exposed surface of the magnetic layer.

Figure 26:
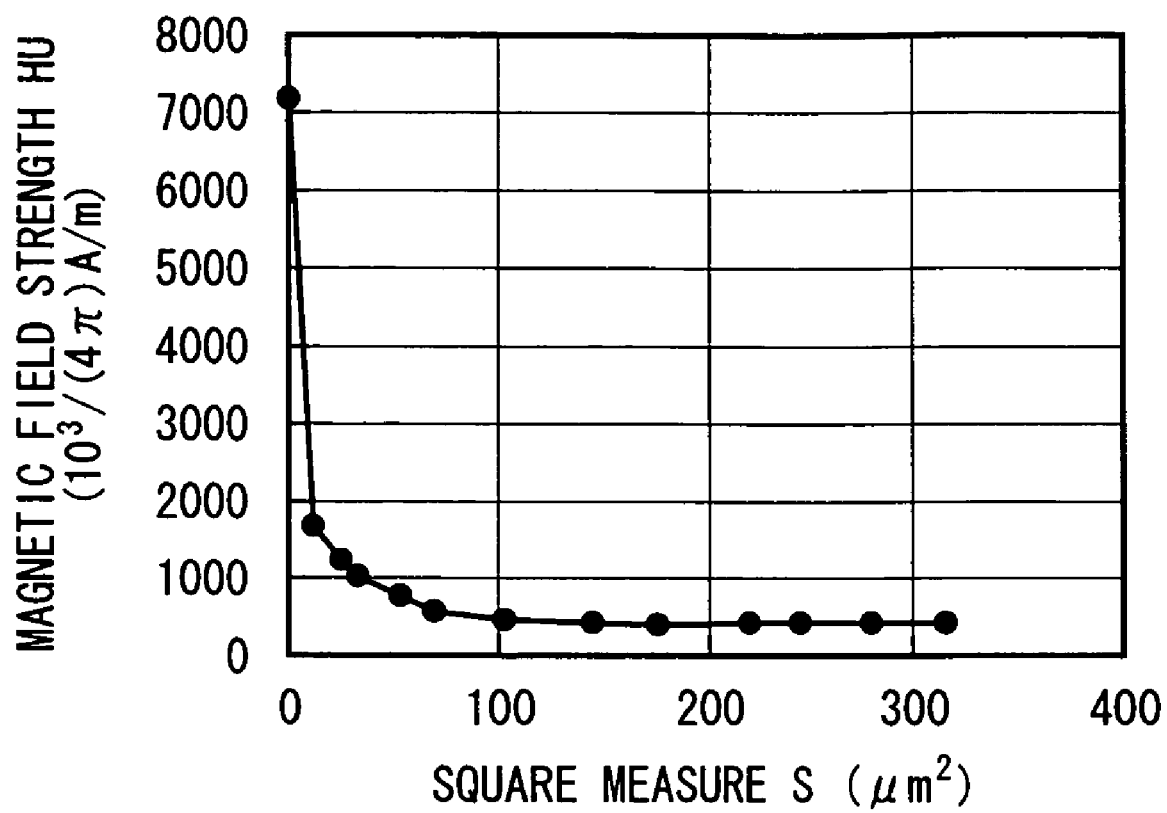
FIG. 26 is a plot showing a correlation between the strength of an unnecessary magnetic field and the square measure of the exposed surface of the magnetic layer.

Finally, when the influence of the square measure of the exposed surface of the magnetic layer exerted on information erasing without intention was examined, the results shown in FIG. 26 were obtained. FIG. 26 shows a correlation between the strength of an unnecessary magnetic field and the square measure of the exposed surface of the magnetic layer, and the horizontal axis indicates the square measure S (μm$^2$) of the exposed surface of the magnetic layer, and the vertical axis indicates the strength of the unnecessary magnetic field (magnetic field strength HU). When the influence of the square measure of the exposed surface of the magnetic layer exerted on information erasing without intention was examined, as the dimensions of the thin film magnetic head, the square measure S of the exposed surface of the magnetic layer was 0.7 μm$^2$ to 315 μm$^2$. Conditions except for the above condition were the same as those in the case shown in FIGS. 24 and 25.

It was obvious from the results shown in FIG. 26 that the magnetic field strength HU was changed in the same manner as the magnetic field strength HU shown in FIG. 24, that is, as the square measure S increased, the magnetic field strength HU was sharply decreased, and then became substantially constant.

On the basis of the appropriate range of the width W5 estimated from FIG. 24, the appropriate range of the square measure S in which information erasing without intention due to a phenomenon that the magnetic flux after recording was focused on the magnetic layer could be prevented was estimated through the use of the results shown in FIG. 26. More specifically, the square measures S corresponding to the width W3=2.0 μm or more, 3.5 μm or more, and 20 μm or more were 7 μm$^2$ or more, 12.25 μm$^2$ or more, and 70 μm$^2$ or more, respectively. Therefore, it was confirmed that in the thin film magnetic head according to the embodiment of the invention, when the square measure S of the exposed surface of the magnetic layer was 7 μm$^2$ or more, preferably 12.25 μm$^2$ or more, and more preferably 70 μm$^2$ or more, information erasing without intention could be prevented.

In this case, in particular, when a relationship between the magnetic square measure of the magnetic layer and the strength of the perpendicular magnetic field was examined on the basis of the above range of the square measure S of the exposed surface of the magnetic layer, the following relationship was established. When the saturated magnetic flux density of the magnetic layer was X[T], and the magnetic square measure of the exposed surface of the magnetic layer was Y[μm$^2$T], the lower limit of the square measure S necessary to prevent information erasing without intention was 7 μm$^2$, so the lower limit of the magnetic square measure Y was 7X[μm$^2$T]. Moreover, when the maximum value of the strength of the perpendicular magnetic field in the case shown in FIG. 26 was examined, it was $9000[\times10^3/(4\pi)]$A/m]. Therefore, in the case where the maximum value of the strength of the perpendicular magnetic field was $9000[\times10^3/(4\pi)]$A/m], when the magnetic square measure Y was 7X[μm$^2$T] or more, information erasing without intention could be prevented, so in the case where the maximum value of the strength of the perpendicular magnetic field was $Z[\times10^3/(4\pi)$A/m], when the magnetic square measure Y was set so as to establish a relationship of $Y \geq \{7X/[9000\times10^3/(4\pi)]\}\times Z$, information erasing without intention could be prevented.

Although the invention is described referring to the embodiment and the example, the invention is not limited to the embodiment and the example, and can be variously modified. More specifically, in the embodiment and the example, the case where the invention is applied to the composite thin film magnetic head is described; however, it is not necessarily limited to the case, and the invention can be applied to, for example, a thin film magnetic head for recording only including an inductive magnetic transducer for writing or a thin film magnetic head having an inductive magnetic transducer for recording/reproducing. In addition, the invention is applicable to a thin film magnetic head with a structure in which a device for writing and a device for reproducing are inversely laminated.

Obviously many modifications and variations of the present invention are possible in the light of the above teachings. It is therefore to be understood that within the scope of the appended claims the invention may be practiced otherwise than as specifically described.

What is claimed is:

1. A perpendicular magnetic recording head, comprising:
   a thin film coil generating a magnetic flux; and
   a pole layer extending from an air bearing surface facing a recording medium to the rear, and guiding the magnetic flux to the recording medium so that the recording medium is magnetized in a direction orthogonal to a surface of the recording medium,
   wherein the pole layer includes a first pole layer portion, a second pole layer portion, and a third pole layer portion in order from the air bearing surface to the rear,
   the first pole layer portion having a first width W1 which determines the recording track width of the recording medium,
   the second pole layer portion having a width which gradually expands from the first width W1 to a second width W2 larger than the first width W1,
   wherein the second pole layer portion is connected to the third pole layer portion in a position where the second pole layer portion has the second width W2, and
   the third pole layer portion having a third width W3 larger than the second width W2.

2. The perpendicular magnetic recording head according to claim 1, wherein
   as a length in an extending direction of the pole layer, the first, the second and the third pole layer portions have a first length L1, a second length L2 and a third length L3, respectively, and
   the ratio W3/(L1+L2+L3) between the third width W3 and the summation L1+L2+L3 of the first, the second and the third lengths satisfies a relationship of W3/(L1+L2+L3) $\geq$ 1.0.

3. The perpendicular magnetic recording head according to claim 2, wherein
   the ratio W3/L3 between the third width W3 and the third length L3 satisfies a relationship of W3/L3 $\geq$ 1.0.

4. The perpendicular magnetic recording head according to claim 2, wherein
   the ratio W2/W3 between the second width W2 and the third width W3 satisfies a relationship of W2/W3 $\leq$ 0.7.

5. The perpendicular magnetic recording head according to claim 2, wherein the summation L1+L2 of the first and the second lengths satisfies a relationship of 0.5 µm≦(L1+L2)≦5.0 µm.

6. The perpendicular magnetic recording head according to claim 1, wherein
an exposed surface exposed to the air bearing surface of the main pole layer has a trapezoidal shape in which a long side positioned on a trailing side and a short side positioned on a leading side are an upper base and a lower base, respectively.

7. The perpendicular magnetic recording head according to claim 1, further comprising:
a magnetic layer extending from the air bearing surface to the rear on a trailing side of the pole layer, the magnetic layer being separated from the pole layer by a gap layer on a side closer to the air bearing surface, and being connected to the pole layer on a side farther from the air bearing surface.

8. The perpendicular magnetic recording head according to claim 7, wherein
the magnetic layer includes:
a first magnetic layer portion being separated from the pole layer by the gap layer, and
a second magnetic layer portion extending from the air bearing surface to the rear on a trailing side of the first magnetic layer portion, the second magnetic layer portion being connected to the first magnetic layer portion on a side closer to the air bearing surface and being connected to the pole layer on a side farther from the air bearing surface.

9. The perpendicular magnetic recording head according to claim 7, wherein
the maximum width of the exposed surface exposed to the air bearing surface of the magnetic layer is larger than the maximum width of the exposed surface exposed to the air bearing surface of the pole layer.

10. The perpendicular magnetic recording head according to claim 7, wherein
the width on a trailing side of the exposed surface exposed to the air bearing surface of the pole layer is 0.2 µm or less, and the square measure of the exposed surface exposed to the air bearing surface of the magnetic layer is 7 µm$^2$ or more.

11. The perpendicular magnetic recording head according to claim 10, wherein
a relationship of $Y \geq \{7X/[9000 \times 10^3/(4\pi)]\} \times Z$ is established, where the saturated magnetic flux density of the magnetic layer is X [T (tesla)], the magnetic square measure of the exposed surface exposed to the air bearing surface of the magnetic layer is Y [µm$^2$T], the maximum value of the strength of a magnetic field magnetizing recording medium is Z[×10$^3$/(4π)A/m].

12. A perpendicular magnetic recording head, comprising:
a thin film coil generating a magnetic flux;
a pole layer extending from an air bearing surface facing a recording medium to the rear, and guiding the magnetic flux to the recording medium so that the recording medium is magnetized in a direction orthogonal to a surface of the recording medium;
a return yoke layer extending from the air bearing surface to the rear on a trailing side of the pole layer, and being connected to the pole layer on a side farther from the air bearing surface; and
a write shield layer disposed in a region close to the air bearing surface between the pole layer and the return yoke layer so as to be separated from the pole layer by the gap layer,
wherein the pole layer includes a first pole layer portion, a second pole layer portion, and a third pole layer portion in order from the air bearing surface to the rear,
the first pole layer portion having a first width W1 which determines the recording track width of the recording medium,
the second pole layer portion having a width which gradually expands from the first width W1 to a second width W2 larger than the first width W1,
wherein the second pole layer portion is connected to the third pole layer portion in a position where the second pole layer portion has the second width W2, and
the third pole layer portion having a third width W3 larger than the second width W2.

13. The perpendicular magnetic recording head according to claim 12, wherein
the write shield layer is exposed to the air bearing surface, and is connected to the return yoke layer.

14. A magnetic recording apparatus, comprising:
a recording medium; and
a perpendicular magnetic recording head recording information on the recording medium,
wherein the perpendicular magnetic recording head includes:
a thin film coil generating a magnetic flux; and
a pole layer extending from an air bearing surface facing a recording medium to the rear, and guiding the magnetic flux to the recording medium so that the recording medium is magnetized in a direction orthogonal to a surface of the recording medium,
wherein the pole layer includes a first pole layer portion, a second pole layer portion, and a third pole layer portion in order from the air bearing surface to the rear,
the first pole layer portion having a first width W1 which determines the recording track width of the recording medium,
the second pole layer portion having a width which gradually expands from the first width W1 to a second width W2 larger than the first width W1,
wherein the second pole layer portion is connected to the third pole layer portion in a position where the second pole layer portion has the second width W2, and
the third pole layer portion having a third width W3 larger than the second width W2.

15. The magnetic recording apparatus according to claim 14, wherein
the recording medium includes a magnetized layer and a soft magnetic layer which are laminated.

\* \* \* \* \*